(12) United States Patent
Frangville et al.

(10) Patent No.: US 12,189,067 B2
(45) Date of Patent: Jan. 7, 2025

(54) IONIZING RADIATION DETECTOR

(71) Applicant: COMMISSARIAT A L'ENERGIE ATOMIQUE ET AUX ENERGIES ALTERNATIVES, Paris (FR)

(72) Inventors: Camille Frangville, Gif sur Yvette (FR); Matthieu Hamel, Gif sur Yvette (FR); Guillaume Bertrand, Gif sur Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/569,426

(22) PCT Filed: Jun. 14, 2022

(86) PCT No.: PCT/EP2022/066180
§ 371 (c)(1),
(2) Date: Dec. 12, 2023

(87) PCT Pub. No.: WO2022/263449
PCT Pub. Date: Dec. 22, 2022

(65) Prior Publication Data
US 2024/0264317 A1    Aug. 8, 2024

(30) Foreign Application Priority Data
Jun. 14, 2021   (FR) ..................... 21 06228

(51) Int. Cl.
*G01T 1/20*    (2006.01)
*G01T 1/203*   (2006.01)
*G01T 3/06*    (2006.01)

(52) U.S. Cl.
CPC .......... *G01T 1/2008* (2013.01); *G01T 1/2033* (2013.01); *G01T 3/06* (2013.01)

(58) Field of Classification Search
CPC ........ G01T 1/2008; G01T 1/2033; G01T 3/06
See application file for complete search history.

(56) References Cited

U.S. PATENT DOCUMENTS

| 5,399,869 A | 3/1995 | Usuda |
| 5,514,870 A * | 5/1996 | Langenbrunner ..... G01T 1/2008 250/367 |

(Continued)

FOREIGN PATENT DOCUMENTS

| CN | 111060953 A | 4/2020 |
| EP | 3 591 025 A1 | 1/2020 |

OTHER PUBLICATIONS

International Preliminary Report on Patentability issued in Application No. EP22733107 dated Apr. 4, 2023.

*Primary Examiner* — Hugh Maupin
(74) *Attorney, Agent, or Firm* — Oblon, McClelland, Maier & Neustadt, L.L.P.

(57) ABSTRACT

A radiation detector may include an active structure having an input face and an output face for incident ionizing radiation. The active structure may include: a first organic scintillator including at least one neutron-absorbing material and enabling discrimination between fast neutrons, thermal neutrons, and photons; at least one second scintillator arranged in front of the first scintillator and capable of preferentially detecting the alpha and/or beta radiation, the two scintillators having, due to the choice of their constituents, different mean pulse decay constants, and the second scintillator having a thickness smaller than the first.

20 Claims, 32 Drawing Sheets

(56) References Cited

U.S. PATENT DOCUMENTS

| | | | |
|---|---|---|---|
| 2004/0104356 A1* | 6/2004 | Bross | G01T 3/06 |
| | | | 250/390.11 |
| 2009/0045348 A1* | 2/2009 | Stuenkel | G01T 3/06 |
| | | | 250/390.11 |
| 2011/0101228 A1 | 5/2011 | Hamby | |
| 2018/0172852 A1* | 6/2018 | Newman | G01V 5/20 |
| 2019/0072678 A1* | 3/2019 | Walker | G01T 1/203 |
| 2020/0241152 A1* | 7/2020 | Newman | A23N 17/02 |
| 2020/0301028 A1* | 9/2020 | Tyagi | C30B 29/12 |

* cited by examiner

IONIZING RADIATION DETECTOR

CROSS-REFERENCE TO RELATED APPLICATIONS

The present application is the national stage of international application PCT/EP2022/066180, filed on Jun. 14, 2022, and claims the benefit of the filing date of French Appl. No. 2106228, filed on Jun. 14, 2021.

TECHNICAL FIELD

The present invention relates to ionizing radiation detectors, in particular scintillation detectors.

PRIOR ART

Scintillation detectors are used in measurement systems for detecting ionizing radiation. They include one or more scintillators which have the ability to emit photons when they absorb a particle or ionizing radiation.

For example, they allow the presence of radioactive sources to be detected on the surface of or inside objects or people, depending on the nature of the radiation. It is useful to be able both to detect and to identify the nature of this radiation qualitatively or quantitatively.

However, there are many different types of radiation, for example alpha, beta, gamma, fast neutron and thermal radiation.

It is known practice to use several sensors to detect different types of radiation simultaneously, for example when searching for contamination or an unknown radioactive source.

However, it is complex and relatively costly to deploy several appliances allowing the detection of several of these types of radiation.

Certain detectors allow up to two or three types of radiation to be detected by means of a single sensor.

Patent application FR3083622, for example, describes a plastic scintillator including chemical elements allowing the detection and discrimination of fast neutrons, thermal neutrons and gamma rays. However, this detector only allows threefold discrimination and does not allow alpha or beta radiation to be differentiated.

It is also known practice to use a detector including several scintillators stacked one on top of the other and coupled to a photodetection system.

Such a detector is commonly known as a "phoswich detector", the term "phoswich" being a contraction of "phosphor sandwich".

The various scintillators that make up a phoswich detector are chosen for their different scintillation properties, for example the average time constant of fluorescence decay. This has a direct impact on the shape and duration of the light pulses. The light signal emitted by each of the scintillators of a phoswich detector exposed to radiation is thus characteristic of the scintillator producing it.

An analysis of the shape of the total light signal collected by the photodetection system allows the region(s) of interaction to be traced, and thus allows the different types of radiation responsible for these interactions to be distinguished.

Certain phoswich detectors include scintillators of different types, namely organic and inorganic scintillators.

An organic/inorganic phoswich structure using pulse shape analysis is thus described in the article by Usuda, S., *Nucl. Instr. Methods A* (1995, 356, 334-338). However, this detector is not sensitive to fast neutrons.

Moreover, the article Pellegrin, S. M.; Whitney, C.; Wilson, C. G. *J. Microelectromech. Syst.* (2010, 19, 1207-1214), describes a phoswich detector that is sensitive to both thermal and fast neutrons, but is not designed to detect alpha or beta radiation.

Furthermore, the systems described below are not transportable or are difficult to transport, and only allow radiation to be characterized without spectrometric information regarding the nature of the source.

DISCLOSURE OF THE INVENTION

There is consequently a need to further improve ionizing radiation detectors, so as to have a relatively compact and inexpensive detector which can discriminate between several different types of radiation, notably more than three. There is also interest in a detector which can also provide spectral information regarding the nature of the radiation detected.

SUMMARY OF THE INVENTION

According to a first aspect of the invention, the object is to meet this need with a radiation detector including an active structure having an input face and an output face for incident ionizing radiation, the active structure including:
- a first organic scintillator including at least one neutron capture material and allowing discrimination between fast neutrons, thermal neutrons and photons,
- at least a second scintillator arranged in front of the first and capable of preferentially detecting alpha and/or beta radiation.

Due to the choice of their constituents, the two scintillators have different mean pulse decay constants and the second is thinner than the first.

The first scintillator may be termed proximal when it is closest to a photon-electron converter in the detector, and the second is termed distal because it is further from the converter than the first scintillator.

The term "second scintillator placed in front of the first" is understood to mean that it is arranged in such a way as to be intercepted by the ionizing radiation before the first.

The assembly of scintillators with different properties allows the responses of the detector to be differentiated according to the nature of the ionizing radiation(s) to which it is exposed.

The term "capable of preferentially detecting alpha and/or beta radiation" denotes a scintillator whose properties, notably its thickness, position and chemical composition, are chosen to favor interactions with alpha and/or beta radiation while at the same time minimizing interactions with other types of radiation, notably gamma rays.

The term "mean decay constant" is used herein to denote the weighted mean value based on the mass content of the various time components of the fluorescence phenomenon.

The term "photons" denotes herein X-rays or gamma rays.

Thus, the detector according to the invention can discriminate between more than three types of ionizing radiation, notably four, namely between fast neutrons, thermal neutrons, photons, and at least one from among alpha or beta radiation, or both.

Preferably, the active structure includes at least a third scintillator arranged in front of the second scintillator, the third scintillator being capable of preferentially detecting alpha radiation. This third scintillator is then further away from the converter than the first and second scintillators.

The second scintillator preferably allows differentiated detection of beta radiation. The detector may then perform fivefold discrimination, i.e. among at least five types of ionizing radiation.

Preferably, the detector includes a gain photon-electron converter, notably a photomultiplier tube (PMT) or a silicon photomultiplier (SiPM), arranged behind the output face of the active structure to collect the light emitted within the various scintillators.

The collected light is preferably amplified and converted into electronic pulses by the photomultiplier. These pulses are then digitized by electronic measuring apparatus, for example a dedicated programmable electronic board or a commercial digitizer.

Such a detector allows discrimination between types of ionizing radiation without the need for several successive series of measurements, thereby reducing the number of times the detector is used, and the time and cost involved in searching for radioactive sources.

The digital signal generated may be processed using various methods, notably pulse shape discrimination (PSD). This method, known to those skilled in the art, is based on the difference in the delayed pulse shape.

To be able to work back to the nature of the ionizing radiation inducing the scintillation, the different pulses can be sorted both according to their morphology and according to the photo-physical properties of the active structure.

It is thus appropriate, firstly, for each scintillator of the active structure to generate its own characteristic signal.

To this end, the detector is preferably designed so that each scintillator has its own mean photoluminescence decay constant, which cannot be confused with that of another scintillator.

Preferably, the first and second scintillators have a mean photoluminescence decay constant that decreases going from the inlet to the outlet. The first, second and third scintillators may have a decreasing mean photoluminescence decay constant going from the distal to the proximal scintillator.

The difference between the values of the mean decay constants of two adjacent scintillators is preferably between 10 and 300 ns, better still between 25 and 250 ns, better still between 30 and 250 ns (limits included). For example, for a detector including three scintillators, the first, second and third scintillators may have a mean decay constant of the order of 10 ns, 40 ns and 70 ns, respectively.

Preferably, the mean decay constant of the first scintillator is between 1 and 20 ns, notably of the order of 10 ns.

It is also appropriate to choose the thickness of each scintillator according to the nature of the radiation(s) with which this scintillator is intended to interact predominantly.

Preferably, the scintillators increase in thickness going from the inlet to the outlet.

The first scintillator, which may be the proximal scintillator, i.e. the one closest to the converter, may be the thickest and has, for example, a thickness of between 3 and 100 mm, preferably between 5 and 10 mm, allowing the interaction with and discrimination of neutrons and photons to be maximized.

The second scintillator may be capable of preferentially detecting beta radiation and preferably has a thickness of between 50 and 250 microns, preferably between 100 and 250 microns, preferably equal to about 150 microns.

Such a thickness allows relatively high interaction with beta radiation, while at the same time minimizing the interaction with other radiation, notably gamma rays.

A scintillator that is capable of preferentially detecting alpha radiation, notably the third scintillator (which may be the most distal of the three scintillators relative to the converter) arranged at the entrance to the active structure, is preferably between 1 and 50 microns thick, better still between 10 and 20 microns.

Preferably, the difference between the refractive indices of two adjacent scintillators is not more than 0.5, better still not more than 0.3, even better still not more than 0.05.

For example, the first scintillator has a refractive index of about 1.58, and the second scintillator has a refractive index of about 1.60.

A small difference between the refractive indices allows the photon losses in the detector to be limited, and thus improves the detector's detection capabilities.

Chemical Composition of the First Scintillator

The first scintillator (which may be the most proximal of the three scintillators relative to the converter) has a chemical composition that allows discrimination between fast neutrons, thermal neutrons and photons.

Preferably, the first scintillator is a "plastic" scintillator, having an organic polymer matrix, preferably of poly(styrene-co-methacrylic acid), and including:
  at least one primary fluorescent element, and
  at least one neutron capture element.

The term "neutron capture element" or "neutron capture material" denotes an element or material which has the ability to absorb a thermal neutron while at the same time emitting a "heavy" secondary particle. The neutron capture element or material includes, for example, lithium, notably in its natural form, in its form isotopically enriched with lithium-6, or any isotopic enrichment between natural lithium and lithium-6, or boron, notably boron-10, or cadmium and gadolinium.

In the case of boron, doping known to those skilled in the art with boron-rich molecules may be used, for example isomers of carborane, in its ortho, meta or para form.

In the case of lithium, doping known to those skilled in the art with lithium carboxylates may be used, or also other strategies such as the use of crown ethers or lithium-based nanoparticles.

Preferably, said primary fluorescent element is chosen from biphenyl, para-terphenyl, meta-terphenyl and 2,5-diphenyloxazole (PPO). The absorption and emission spectra of such elements are, for example, centered around 330 nm and 370 nm, respectively.

The first scintillator preferably includes at least one secondary fluorescent element, for example chosen from bis(methylstyryl)benzene (bis-MSB), 9,10-diphenylanthracene (9,10-DPA), and 1,4-bis(5-phenyl-2-oxazolyl)benzene (POPOP).

This element allows the emission wavelength of the primary fluorophores to be shifted to a higher emission wavelength. The choice of emission wavelength is made possible by the choice of the secondary fluorophore, and a person skilled in the art will be able to select the molecule that is the most suitable for the purpose.

Preferably, the first scintillator has an emission spectrum whose maximum is at a wavelength of between 400 and 630 nm, in particular about 425 nm.

Inorganic Scintillator for Gamma Spectrometry

The active structure according to the invention may also include an inorganic scintillator capable of gamma spectrometry.

Such an active structure makes it possible to establish a description of the energy profile of incident gamma radiation, and thus possibly to identify the source of the radiation.

This scintillator is preferably positioned alongside or below the first scintillator. It may also be arranged within the first scintillator.

This scintillator has, for example, a thickness of between 2 and 50 mm.

This scintillator is, for example, based on bismuth germanate (BGO).

IMPLEMENTATION EXAMPLES

In a first implementation example of the invention, all the scintillators in the detector are of the plastic scintillator type.

The second and/or third scintillator are, for example, obtained commercially from suppliers of plastic scintillators (for example the EJ-240 scintillator from Eljen Technology or the BC-444 scintillator from Saint-Gobain Cristaux et Détecteurs, having a mean photoluminescence decay constant of about 280 ns).

As a variant, the second and/or third scintillators may be prepared via the process described in patent application FR3075977.

In another implementation example, at least one scintillator of the detector, preferably the scintillator arranged at the entrance of the active structure, is of inorganic type. This scintillator is, for example, based on silver-doped zinc sulfide (ZnS:Ag) or cerium-doped gadolinium pyrosilicate ($Gd_2Si_2O_7$:Ce).

In another implementation example, at least one scintillator of the detector, preferably the scintillator arranged below or next to the first scintillator, is an inorganic scintillator. This scintillator is, for example, based on bismuth germanate (BGO).

Process for Detecting and Discriminating Ionizing Radiation

A subject of the invention is also a process for the detection and discrimination of ionizing radiation using a detector as defined above, the input side of which is exposed to a radiation source, the process including the step consisting in:

analyzing, at least on the basis of knowledge of the mean decay constants of the scintillators, the optical signal generated by the active structure so as to discriminate the nature of the radiation from among at least four different types of radiation, preferably at least five.

Preferably and as mentioned above, the optical signal generated by the active structure is collected by a gain photon-electron converter, notably a photomultiplier tube (PMT) or a silicon photomultiplier (SiPM), so as to be converted into an electrical pulse.

Preferably, discrimination between the different radiations is performed by means of a pulse shape discrimination (PSD) method.

The gamma component of the incident radiation can also be analyzed spectrometrically, if the detector includes an inorganic scintillator that allows this.

DETAILED DESCRIPTION

Figure 1:
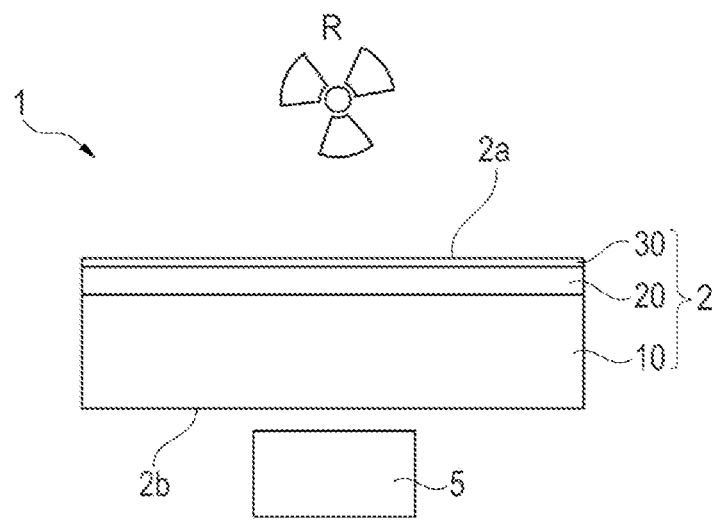
FIG. 1 is a partial schematic representation of an example of a detector according to the invention.

FIG. 1 shows an example of a radiation detector 1 according to the invention. Detector 1 comprises an active structure 2 having a radiation input face 2a and an output face 2b for radiation not entirely stopped by the active structure. The source of the radiation R to be detected is located on the side of the input face 2a.

In the example under consideration, the active structure 2 is in the form of a stack of three detection layers, each including a scintillator of a given thickness, the scintillators increasing in thickness from the detector input 2a to the output 2b.

Thus, scintillator 30, located at the front of the detector, has the finest thickness. Scintillator 20 is located directly behind scintillator 30 and is thicker than scintillator 30. Finally, scintillator 10 is located behind scintillator 20 and has the largest thickness of the three scintillators.

Such an active structure is, for example, generally cylindrical or parallelepipedal in shape.

The detector also includes a converter, such as a photomultiplier 5, located behind the active structure 2, i.e. on the output side 2b, which collects the light emitted by the various scintillators 10, 20 and/or 30 and converts the optical signal collected into an electrical signal. The electrical signal generated has pulses characteristic of the energy deposited by the ionizing radiation in the detector.

The scintillators of the active structure 2 are designed to have different response properties to ionizing radiation, which enables the different pulses to be sorted so as to identify the nature of the ionizing radiation(s) inducing scintillation.

Scintillator 10 is, for example, a plastic scintillator whose composition allows discrimination between fast neutrons, thermal neutrons and gamma rays, as described below.

Scintillator 20 is, for example, a plastic scintillator that is preferentially capable of detecting beta radiation, while scintillator 30 preferentially detects alpha radiation.

Thus, a fivefold discrimination between different types of ionizing radiation is possible with such a structure.

Each of these scintillators firstly has its own mean photoluminescence decay constant, which cannot be confused with that of any other scintillator, and secondly a thickness chosen to favor interactions with the type(s) of radiation to be detected.

Example 1

Figure 2:
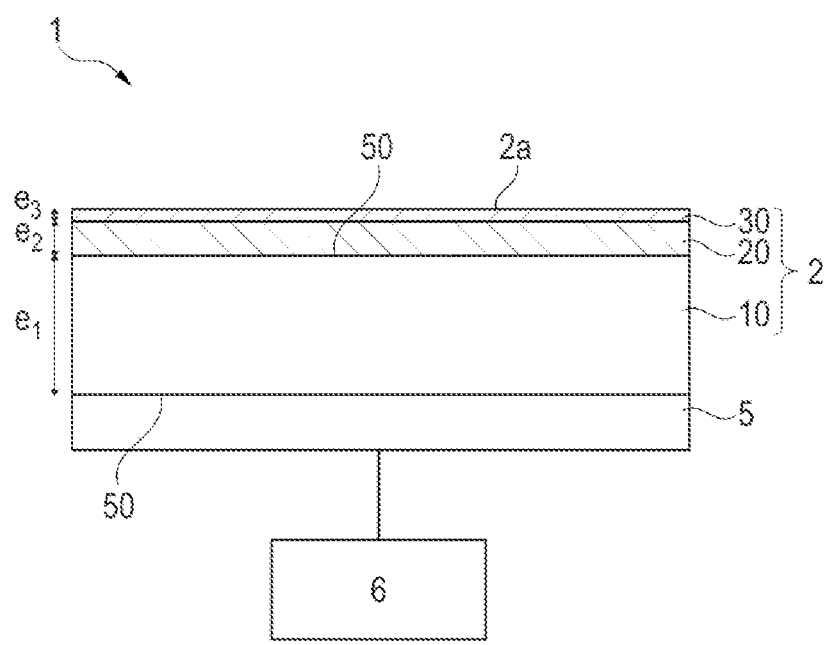
FIG. 2 is a partial schematic representation of one embodiment example of a detector.

FIG. 2 shows an implementation example of a detector 1 according to the invention, including three plastic scintillators 10, 20 and 30.

In this example, scintillator 10 consists of a poly(styrene-co-methacrylic acid) polymer matrix including the fluorescent elements 2,5-diphenyloxazole (PPO) and 1,4-bis(5-phenyl-2-oxazolyl)benzene (POPOP), and a thermal neutron-absorbing element, lithium alpha-valerate, said compound being isotopically enriched in the lithium-6 isotope via the process described in patent application FR3083622.

Scintillator 10 is thus prepared independently of scintillators 20 and 30, by adding styrene, methacrylic acid, PPO, POPOP and lithium alpha-valerate to a one-necked flask. The solution is then saturated with neutral gas, followed by five cold vacuum degassing cycles. The solution is then packaged in an airtight glass mold, which gives the scintillator its final shape. The solution is heated at 80° C. for 8 weeks under an inert atmosphere. Scintillator 10 is removed from the mold, cut and polished.

Scintillator 10 thus obtained has a thickness $e_1$ of about 7000 μm and a mean photoluminescence decay constant $\tau_1$ of about 3.3 ns.

Scintillator 10 has, for example, a refractive index of about 1.58.

Scintillators 20 and 30 may be prepared directly one on top of the other. As a variant, scintillators 20 and 30 may be bonded together using an optical binder.

Plastic scintillator 20 may be produced via the process described in patent application FR3075977, which discloses a method for preparing plastic scintillators with mean decay constants of between 2 and 88 ns.

For example, a mixture of polystyrene, naphthalene, PPO and 9,10-diphenylanthracene is prepared, these elements being dissolved in toluene. The solution is poured onto a glass plate and spread using a doctor blade-type spreading device, then left under ventilation for the toluene to evaporate off, i.e. about 2 days, depending on the thickness.

In the example under consideration, but not limiting in the preparation, scintillator 20 thus obtained has a thickness $e_2$ of about 150 μm and a mean photoluminescence decay constant $\tau_2$ of about 35 ns.

Scintillator 20 has, for example, a refractive index of about 1.60.

The same method may be used to prepare plastic scintillator 30: a mixture of polystyrene, naphthalene, PPO and 9,10-diphenylanthracene dissolved in toluene is prepared, in proportions, for example, different from those used for preparing scintillator 30, for example those described in patent application FR3075977.

The solution thus obtained may be poured and spread directly onto scintillator 20 by means of the same spreading device (such as a doctor blade), then left under ventilation for a period of about two hours to evaporate off the toluene.

Scintillator 30 thus obtained has a thickness $e_3$ of about 17 μm and a mean photoluminescence decay constant $\tau_3$ of about 71 ns, and a refractive index of about 1.60.

Scintillator 10 is connected to scintillators 20 and 30 by means of an optical binder 50, for example an optical grease known to those skilled in the art, so that the three scintillators are arranged from the thinnest to the thickest going from the inlet 2a to the outlet 2b of the active structure, as illustrated in FIG. 2.

Other types of optical binder may be considered, for example an optical cement or a viscous transparent liquid with an optical index, also known as the refractive index, of about 1.6 at 425 nm, or any other material that is transparent to the emission wavelength of the various scintillators. For example, an optical binder with a thickness of 50 μm is prepared.

In this example, scintillators 10, 20 and 30 have an emission spectrum whose maximum is at a wavelength of 425 nm for scintillator 10, and 435 nm for scintillators 20 and 30.

Detector 1 also includes a photomultiplier 5, for instance the Hamamatsu commercial photomultiplier tube (registered trademark) R6231, which is coupled to the output face 2b of active structure 2, for example by means of an optical grease 50.

The photomultiplier 5 is supplied with high voltage, for example 1070 V, and connected to a digitizer 6 so as to transform the electrical signal into a digital signal.

The digital signal thus generated may be used to represent the detection results in various ways.

For example, the two-dimensional spectrum representing, for each pulse, the ratio $Q_{tail}/Q_{tot}$ of the delayed charge $Q_{tail}$ of the pulse to the total charge $Q_{tot}$ of the same pulse may be plotted as a function of the total charge $Q_{tot}$, as illustrated for different radiation sources in FIGS. 3a, 4a, 5a, 6a, 7a, 8a and 9a.

The total charge $Q_{tot}$ is calculated by integrating the current carried by the pulse between its start and 780 ns.

The delayed charge $Q_{tail}$ is calculated as the integral of the current carried by the pulse between 42 and 780 ns.

The ratio $Q_{tail}/Q_{tot}$ thus provides indications of the pulse's broader or narrower shape, and allows the emergence of pulse grouping zones by interaction type.

In order to determine zones of interest according to the different types of ionizing radiation, detector 1 is first subjected to a single source of radiation at a time. These defined zones may subsequently be used to discriminate between multiple types of ionizing radiation.

Detector 1 is thus subjected to a californium-252 neutron/gamma source located about 8 cm from the input face 2a.

Thermal neutrons are generated by partial thermalization of the californium-252 source, which is shielded by 5 cm of high-density polyethylene (HDPE) and 3 cm of lead, allowing the energy of the neutrons emitted by the source to be degraded until thermal neutrons are obtained.

Figure 3A:
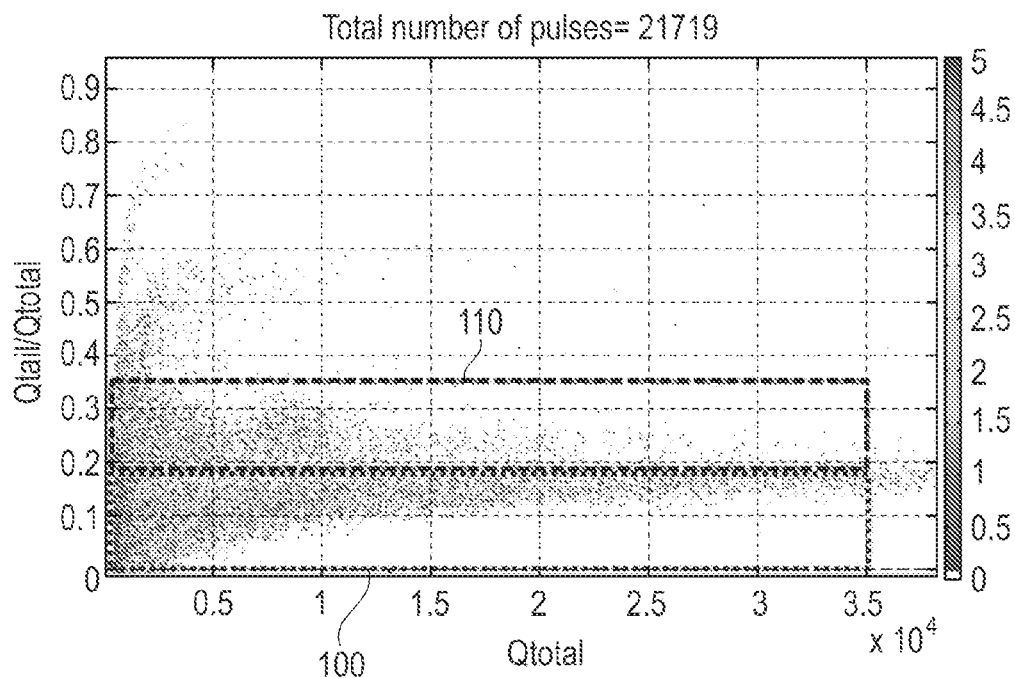
FIG. 3a, FIG. 3b and FIG. 3c illustrate detection results when the detector in FIG. 2 is exposed to a source of neutrons and gamma rays jointly emitted by californium-252.

The two-dimensional spectrum of the detection results for this source is represented in FIG. 3a. Pulse shape analysis (PSD) allows two grouping zones 100 and 110 to emerge: zone 100, which comprises the lower lobe of the spectrum, groups together pulses resulting from interactions with gamma rays, and zone 110, which lies above zone 100, groups together pulses resulting from interactions with neutrons.

Interactions of the detector with thermal neutrons may be discriminated from those with fast neutrons by separating zone 110 into two subzones (not shown), one subzone including the lobe extending widthwise for fast neutrons, and one subzone including the oval above this lobe for thermal neutrons.

These zones thus defined allow the number of events derived from each type of radiation to be isolated. The energy spectrum for each type of radiation can then be obtained, as shown in FIGS. 3b and 3c for neutrons and gamma rays, respectively.

Figure 3B:
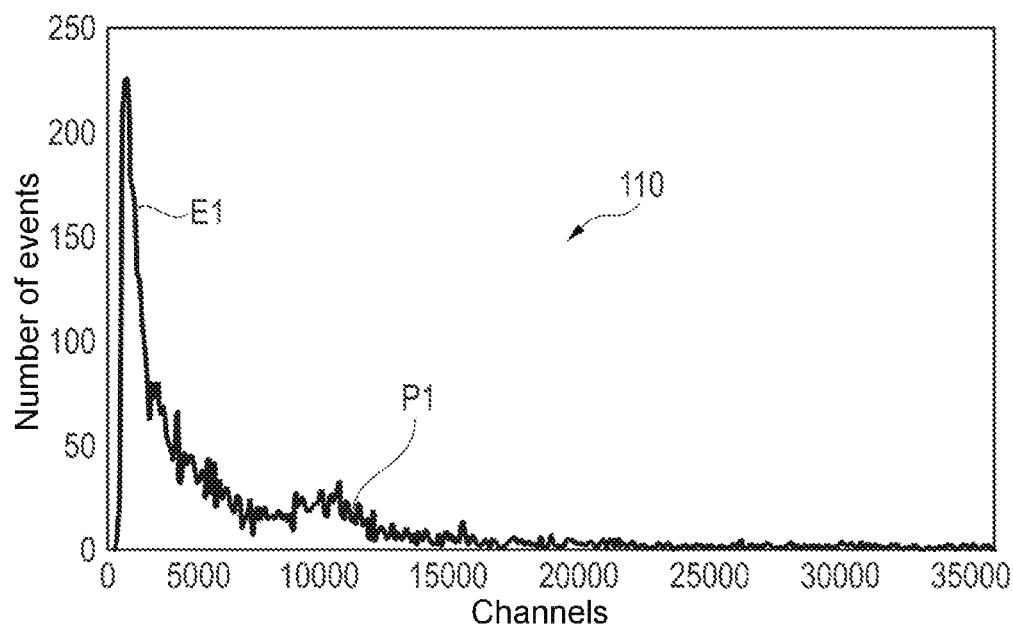
Figure 3C:
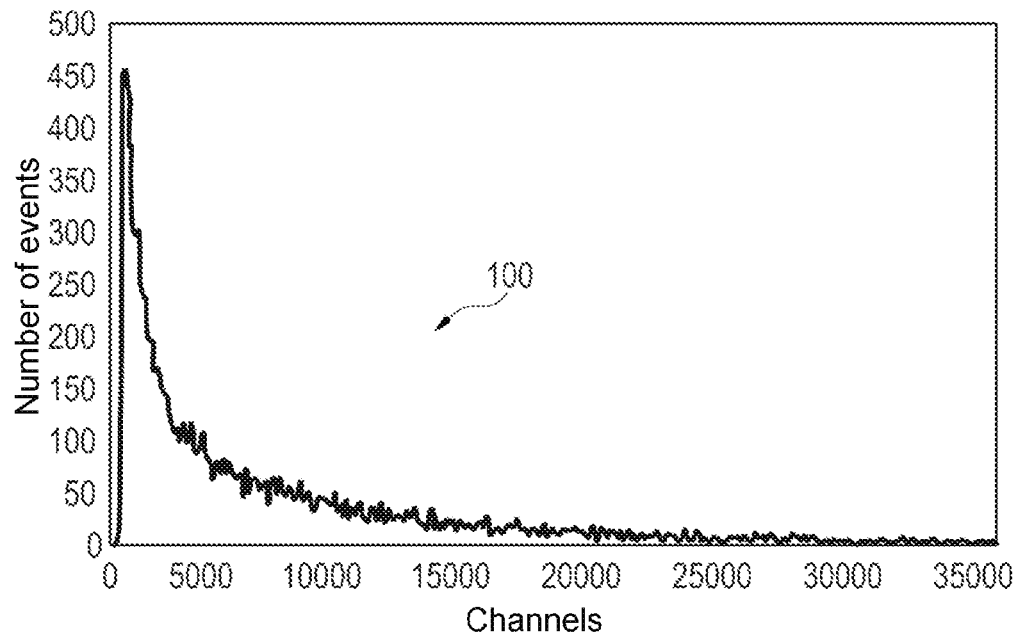

These graphs are obtained by projecting the zone of interest of the two-dimensional spectrum on the x-axis: the x-axis on the graphs in FIGS. 3B and 3C represents the energy channels of the histogram, i.e. the total charge $Q_{tot}$, and the y-axis the number of events counted for each total charge value.

The neutron energy spectrum represented in FIG. 3b has an exponential-type spread E1 and a peak P1, E1 extending between 0 and 35 000 channels and P1 between 5000 and 10 000 channels, corresponding to the interactions of fast neutrons and thermal neutrons with scintillator 10, respectively.

In the same manner as described above, detector 1 is subjected to a carbon-14 beta source, placed in contact with active structure 2. Energy deposition takes place in scintillators 10, 20 and 30.

Figure 4A:
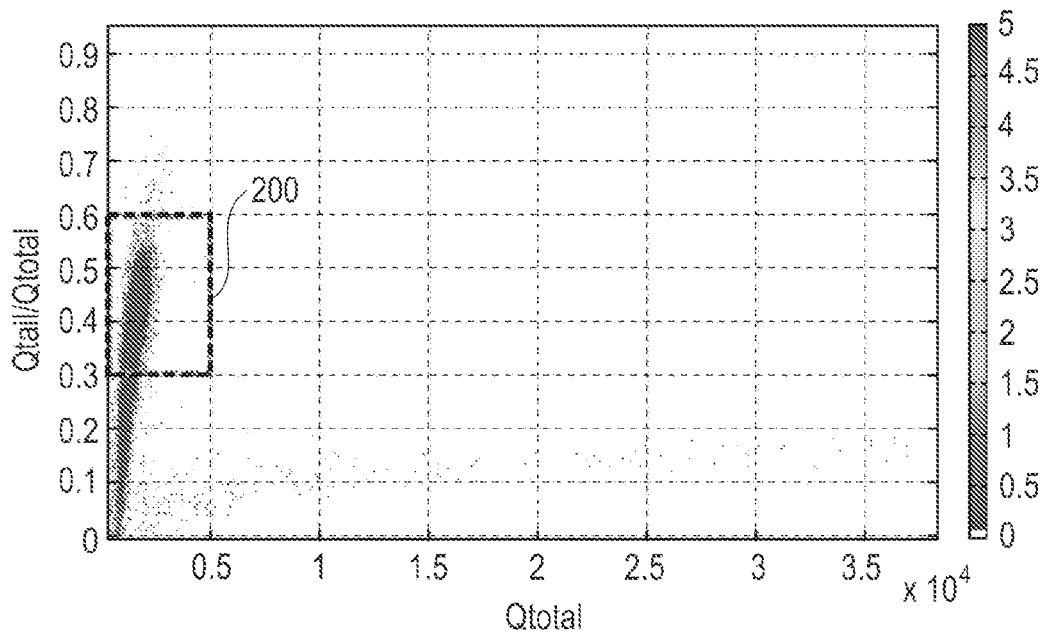
FIG. 4a and FIG. 4b illustrate detection results when the detector in FIG. 2 is exposed to a carbon-14 beta radiation source.

Only the pulses received by scintillators 20 and 30 are counted, and represented on the two-dimensional spectrum in FIG. 4a, allowing a zone of interest 200 to be defined, grouping together the pulses resulting from the interactions of the detector with the beta radiation.

Figure 4B:
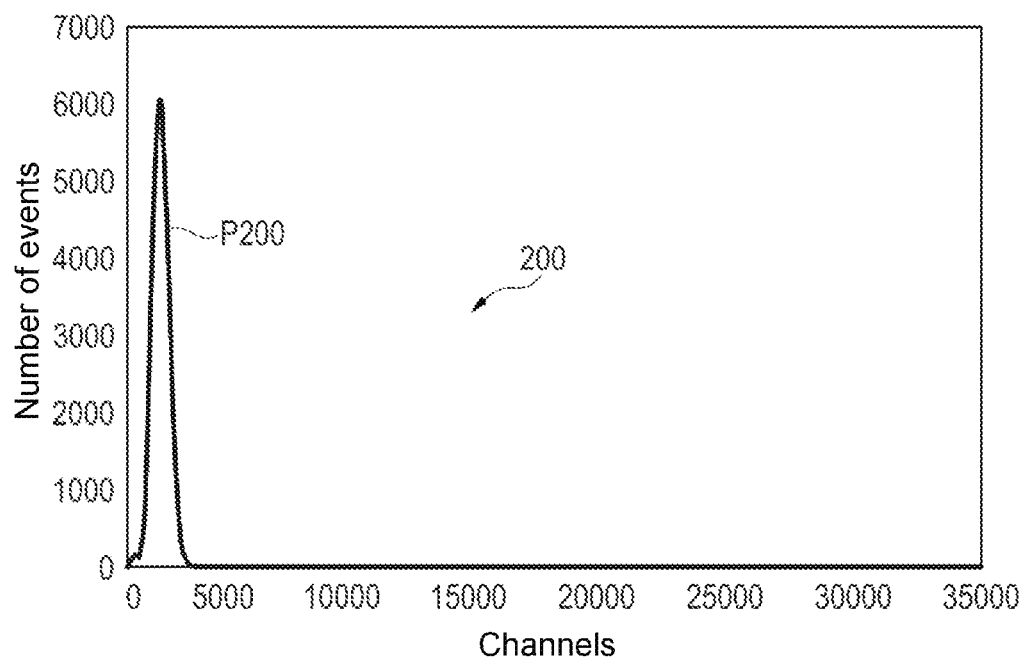

The corresponding beta energy spectrum is represented in FIG. 4b. It has a distinctive peak P200 between 0 and 5000 channels.

Detector 1 is subjected to a plutonium-239 alpha/gamma source, placed in contact with active structure 2 on the input side 2a. Alpha interaction energy is deposited in scintillator 30, while gamma interaction energy is deposited in scintillator 10.

Figure 5A:
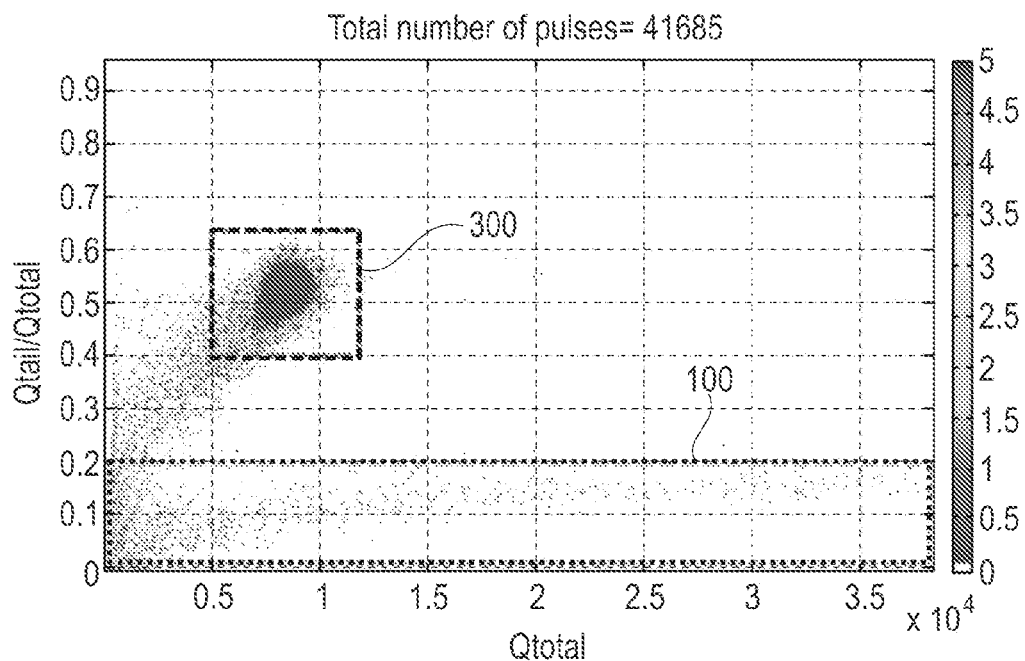
FIG. 5a and FIG. 5b illustrate detection results when the detector in FIG. 2 is exposed to a plutonium-239 alpha/gamma radiation source.

The pulses received by scintillator 30 are counted, and a zone of interest 300 grouping together the pulses resulting from alpha interactions is defined on the two-dimensional spectrum, as shown in FIG. 5a. Pulses resulting from gamma interactions with scintillator 10 are grouped together in zone 100 defined above.

Figure 5B:
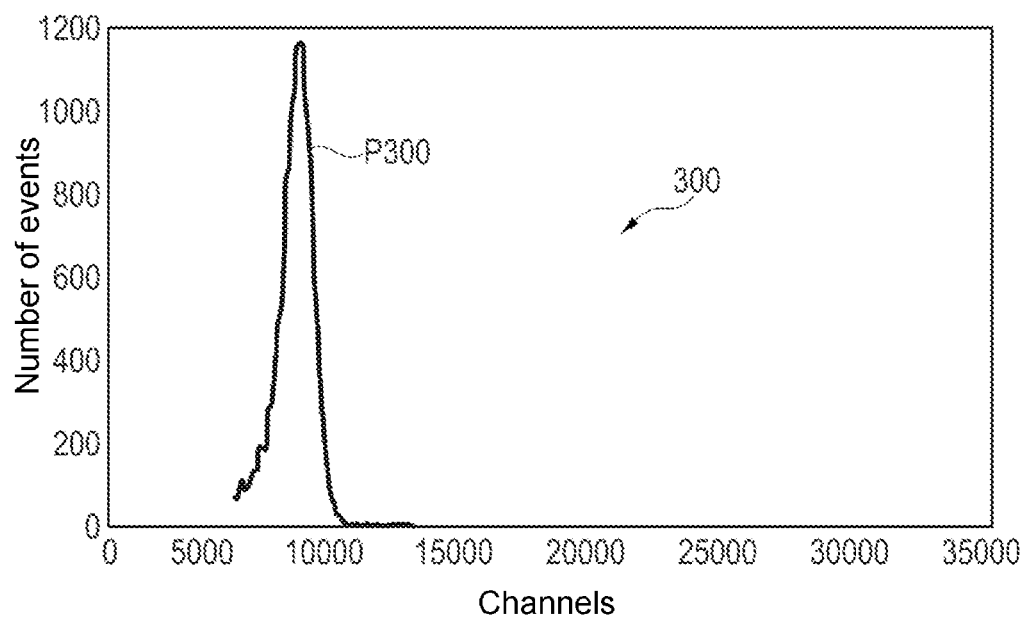

The alpha radiation energy spectrum is represented in FIG. 5b. It has a distinctive peak P300 between 5000 and 12 000 channels.

The grouping zones by radiation type are summarized in Table 1 below.

TABLE 1

|  | x-axis ($Q_{tot}$) | y-axis ($Q_{tail}/Q_{tot}$) |
|---|---|---|
| Alpha - Zone 300 | 5000-12000 | 0.4-0.62 |
| Beta - Zone 200 | 0-5000 | 0.3-0.6 |
| Neutrons - Zone 110 | 0-35000 | 0.19-0.33 |
| Gamma - Zone 100 | 0-35000 | 0-0.1875 |

As mentioned previously, these zones thus defined allow discrimination between the different types of radiation detected simultaneously by detector 1.

By way of example, detector 1 is simultaneously subjected to two sources of ionizing radiation, namely a californium-252 source and a plutonium-239 source.

Figure 6A:
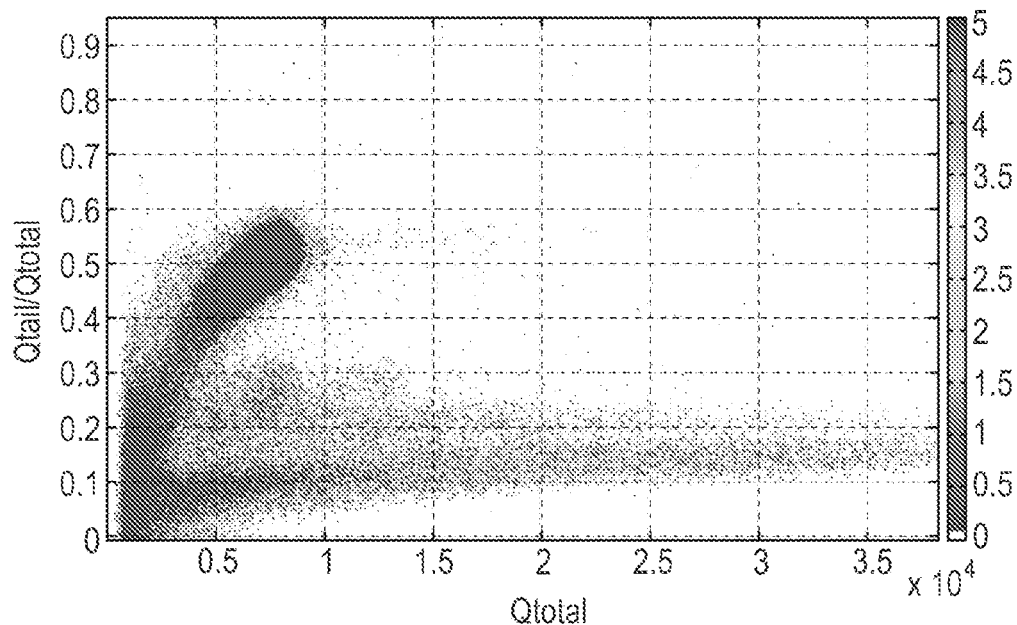
FIG. 6a, FIG. 6b, FIG. 6c and FIG. 6d illustrate detection results when the detector in FIG. 2 is simultaneously exposed to two radiation sources, plutonium-239 and californium-252.
Figure 6B:
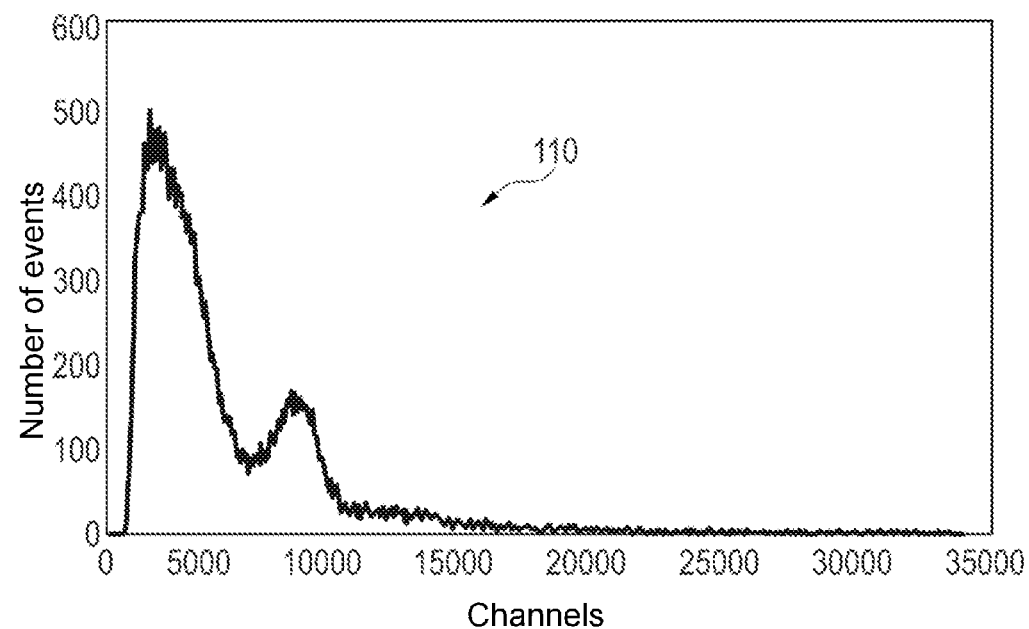
Figure 6C:
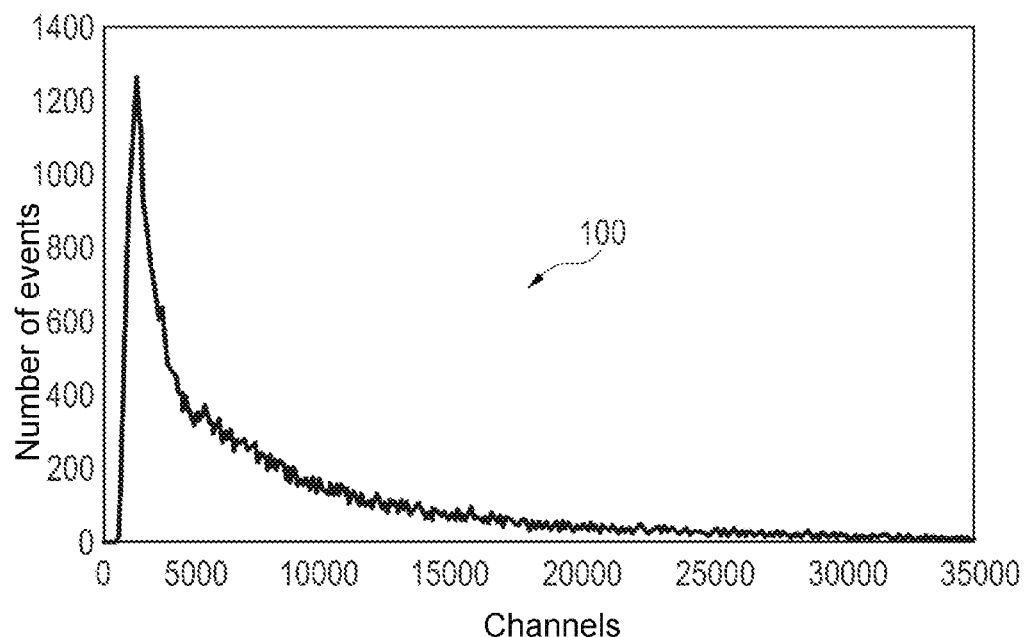
Figure 6D:
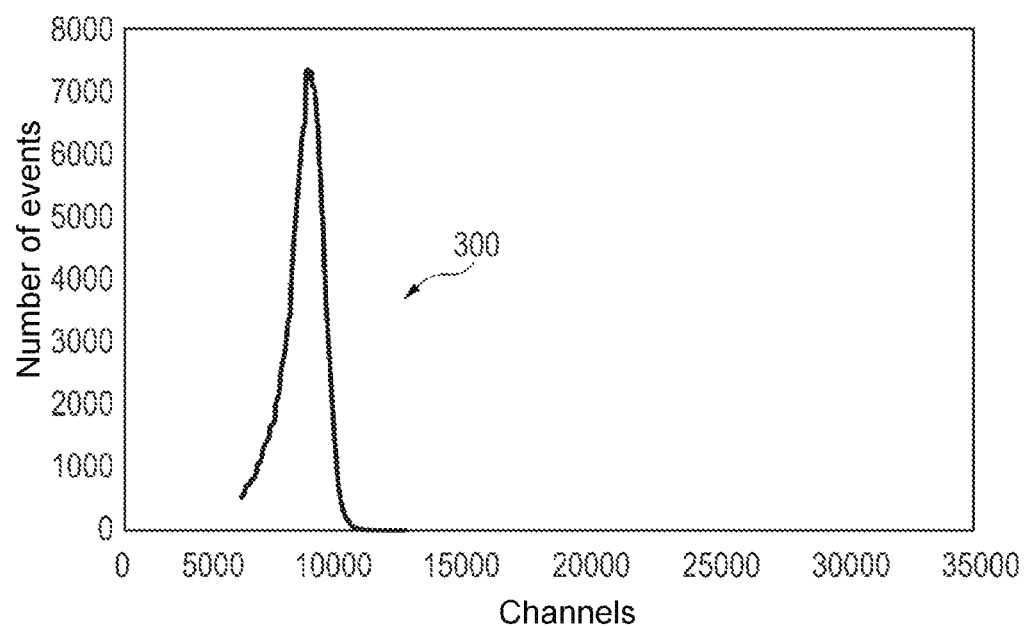

The detection results are shown in FIGS. 6a to 6d. As these figures show, detector 1 has the ability to discriminate between neutrons (FIG. 6b), gamma radiation (FIG. 6c) and alpha radiation (FIG. 6d).

Figure 7A:
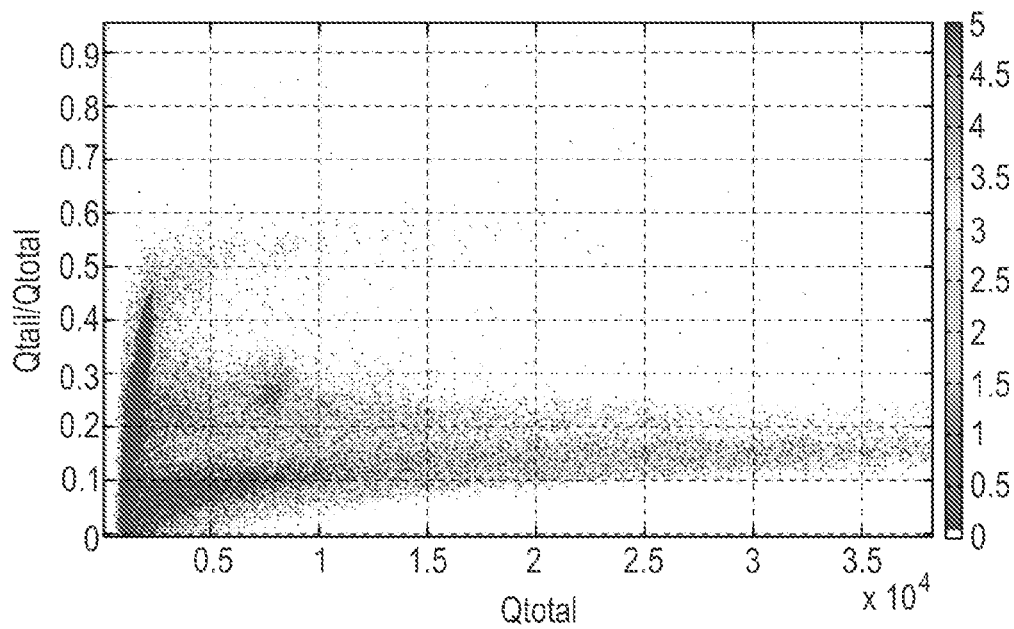
FIG. 7a, FIG. 7b, FIG. 7c and FIG. 7d illustrate detection results when the detector in FIG. 2 is simultaneously exposed to two radiation sources, carbon-14 and californium-252.
Figure 7B:
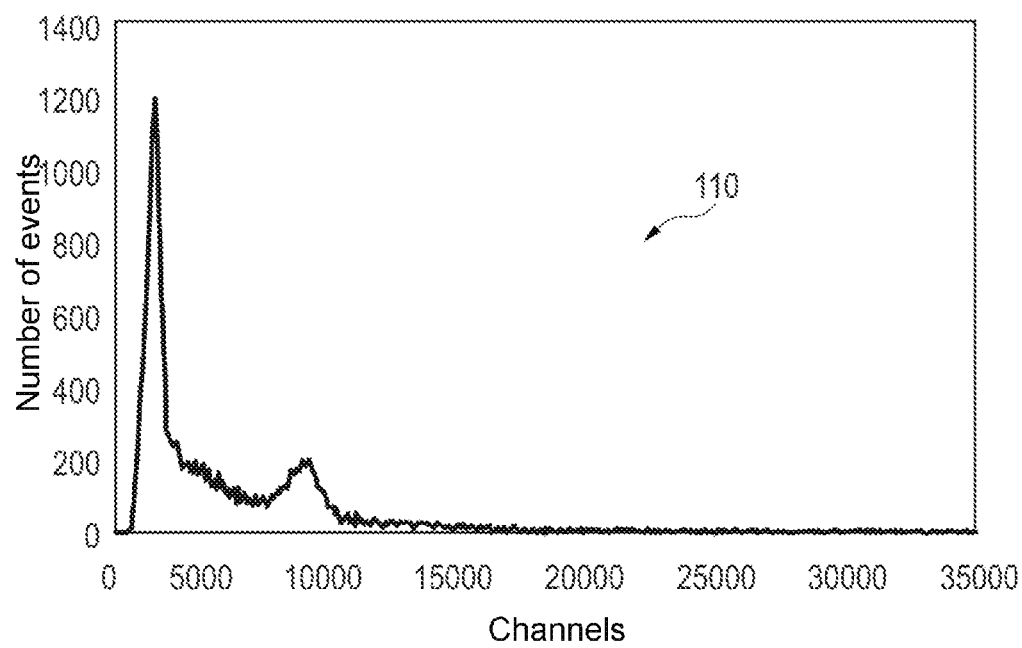
Figure 7C:
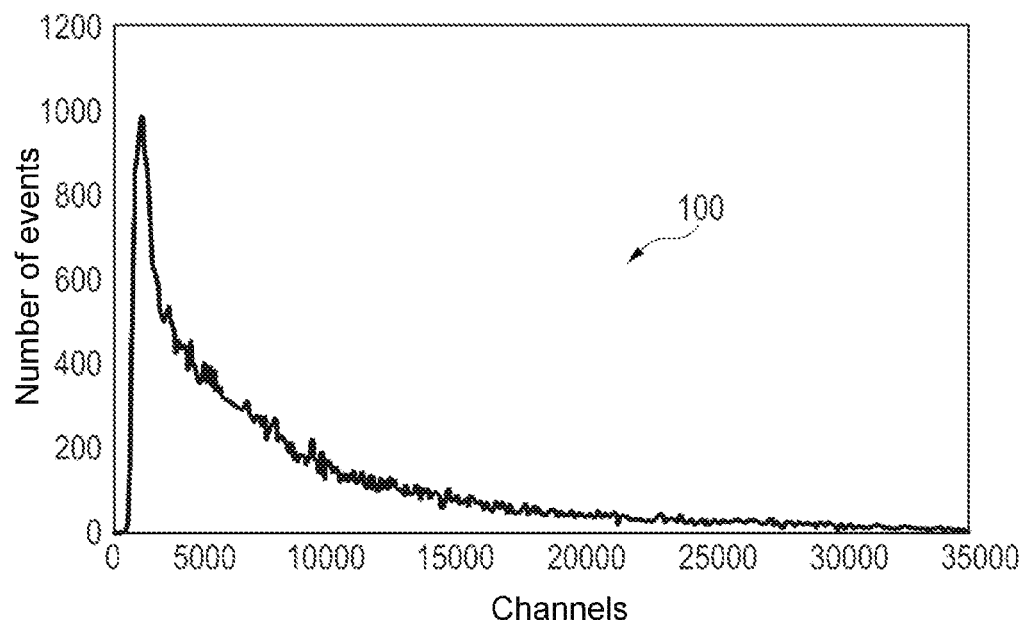
Figure 7D:
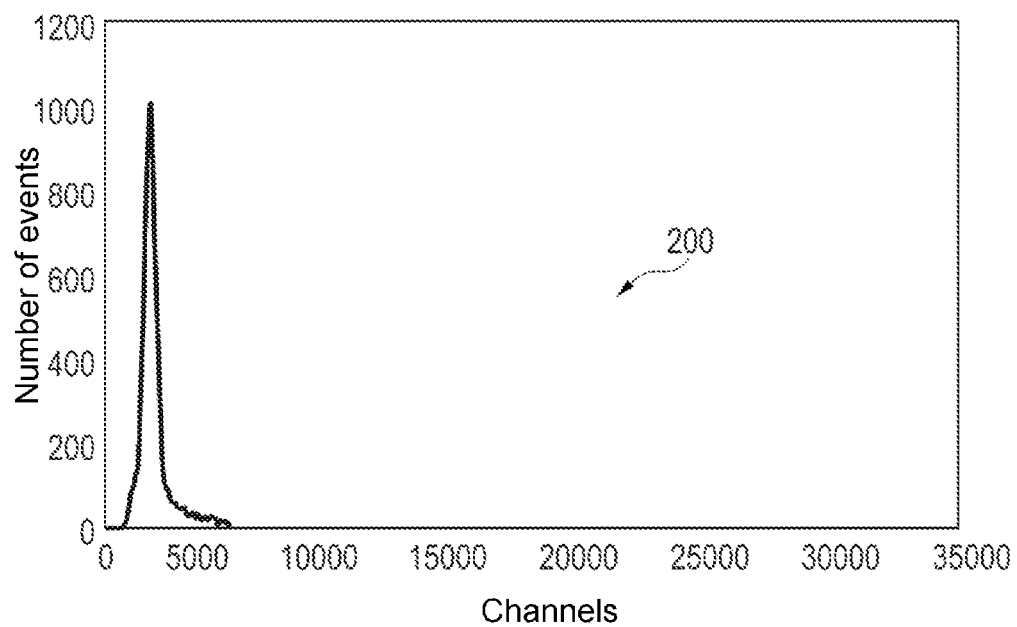

In the example shown in FIGS. 7a to 7d, detector 1 is simultaneously subjected to a californium-252 source and a carbon-14 source, and has the ability to discriminate neutrons (FIG. 7b), gamma radiation (FIG. 7c) and beta radiation (FIG. 7d).

Figure 8A:
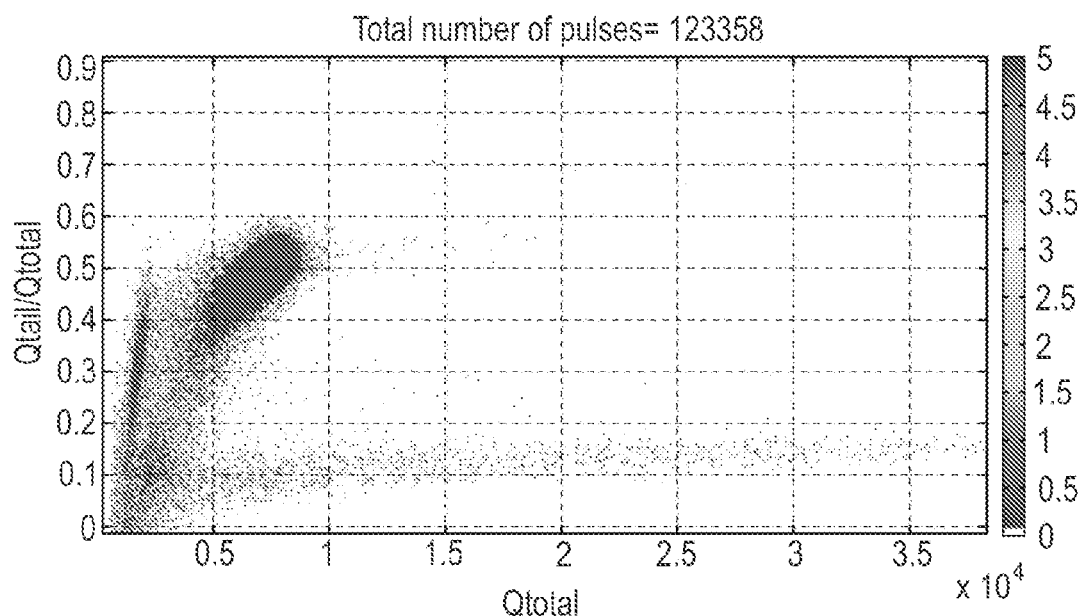
FIG. 8a, FIG. 8b and FIG. 8c illustrate detection results when the detector in FIG. 2 is simultaneously exposed to two radiation sources, carbon-14 and plutonium-239.
Figure 8B:
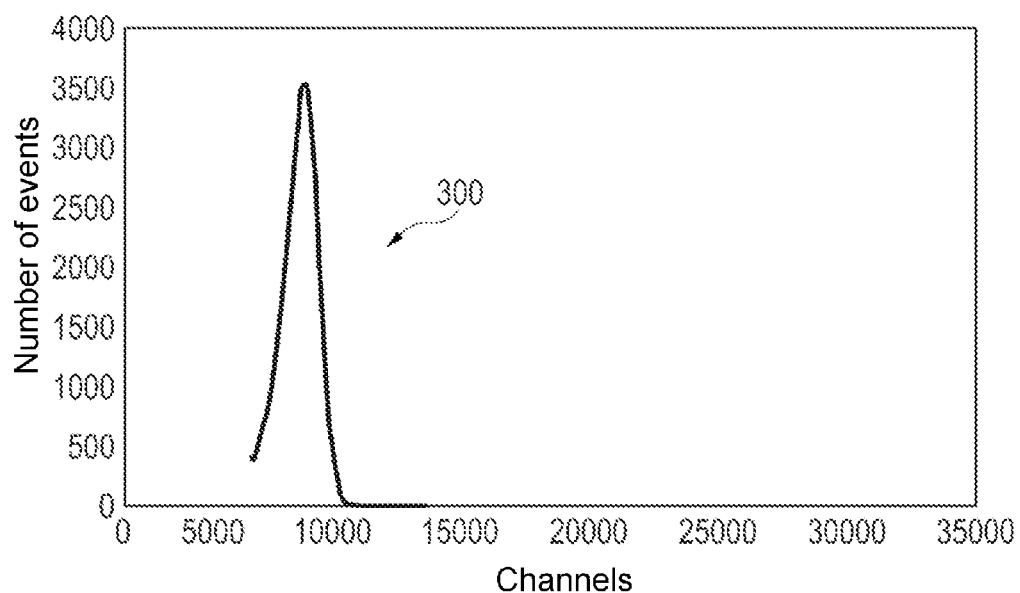
Figure 8C:
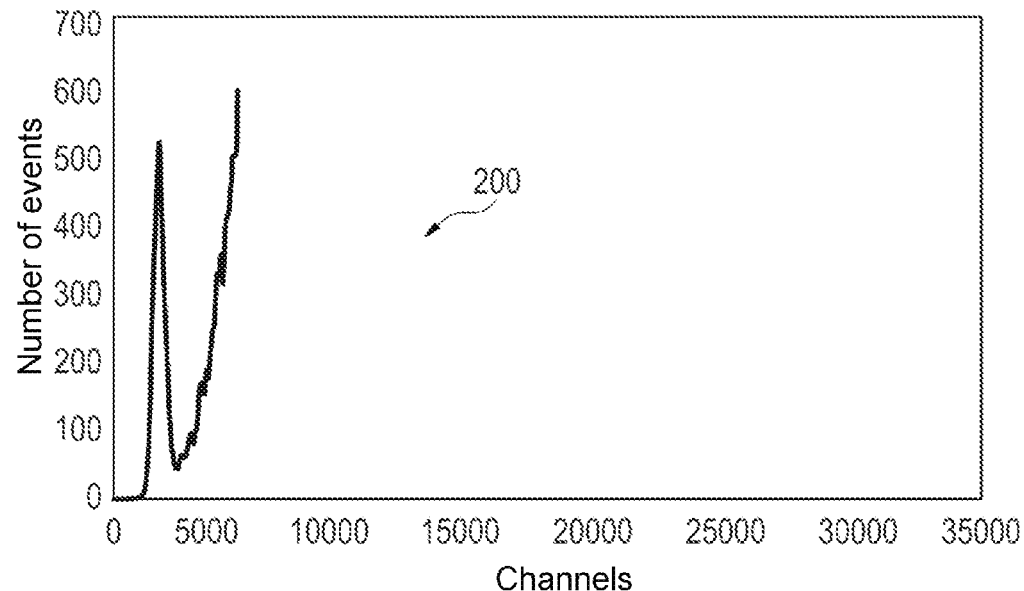

In the example shown in FIGS. 8a to 8c, detector 1 is simultaneously subjected to a californium-252 source and a plutonium-239 source, and has the ability to discriminate alpha radiation (FIG. 8b) from beta radiation (FIG. 8c).

Finally, in the example shown in FIGS. 9a to 9e, detector 1 is subjected simultaneously to the three abovementioned sources of ionizing radiation, namely a californium-252 source, a carbon-14 source and a plutonium-239 source.

Figure 9A:
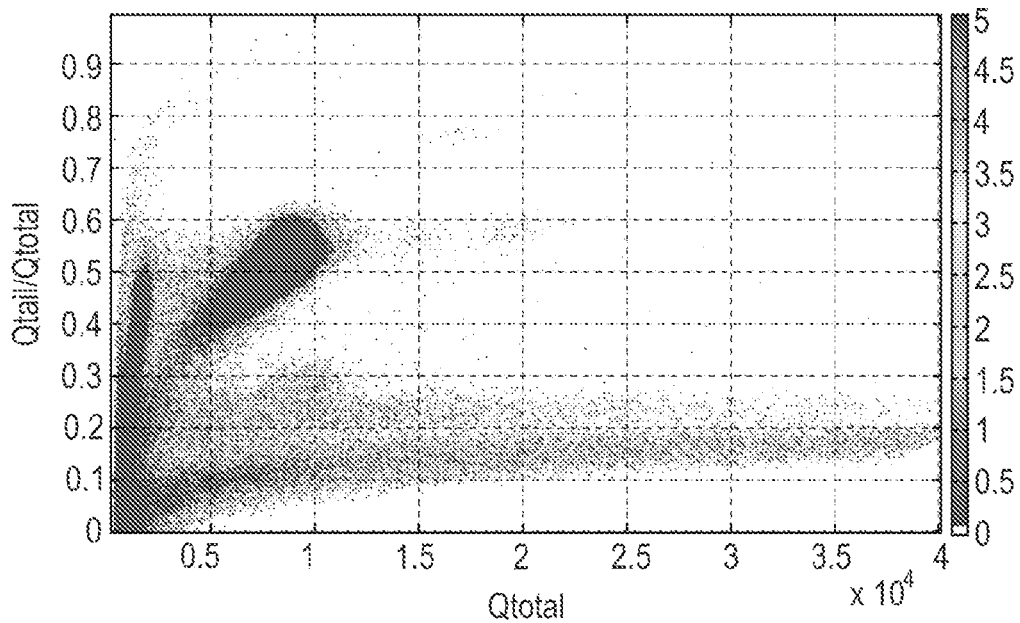
FIG. 9a, FIG. 9b, FIG. 9c, FIG. 9d and FIG. 9e illustrate detection results when the detector in FIG. 2 is simultaneously exposed to three radiation sources, carbon-14, plutonium-239, and californium-252.
Figure 9B:
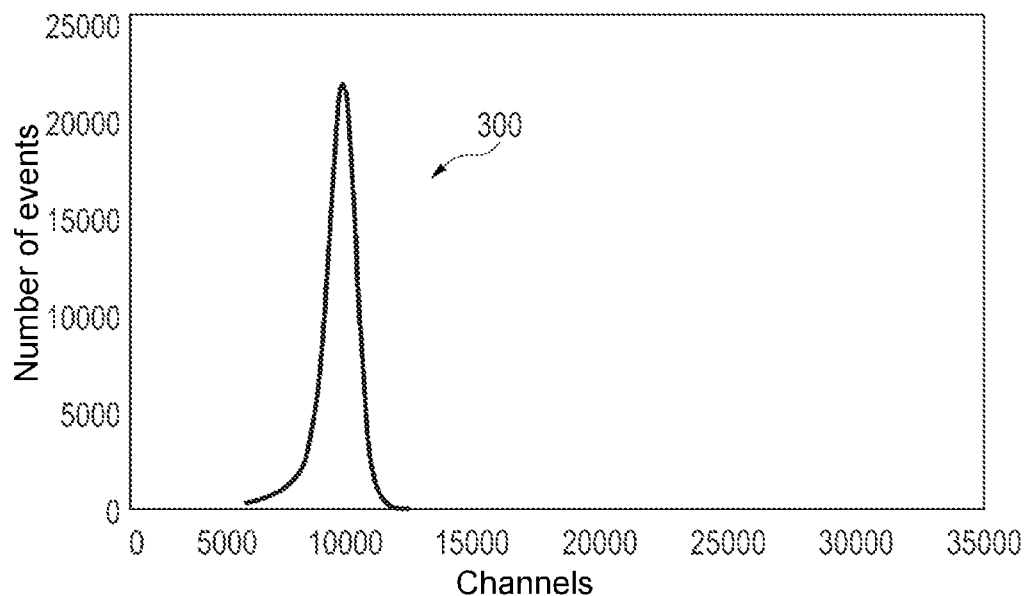
Figure 9C:
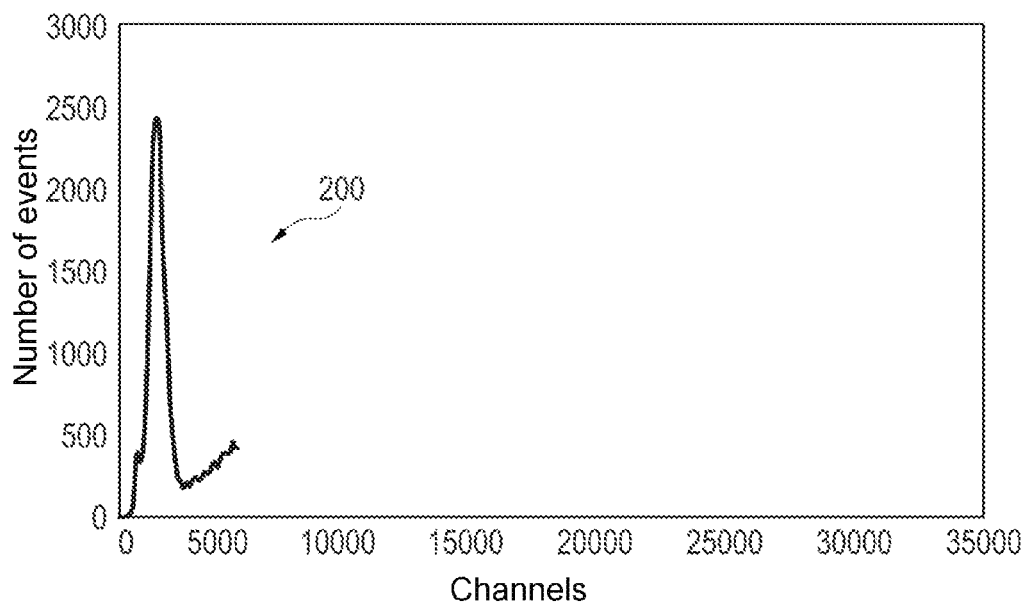
Figure 9D:
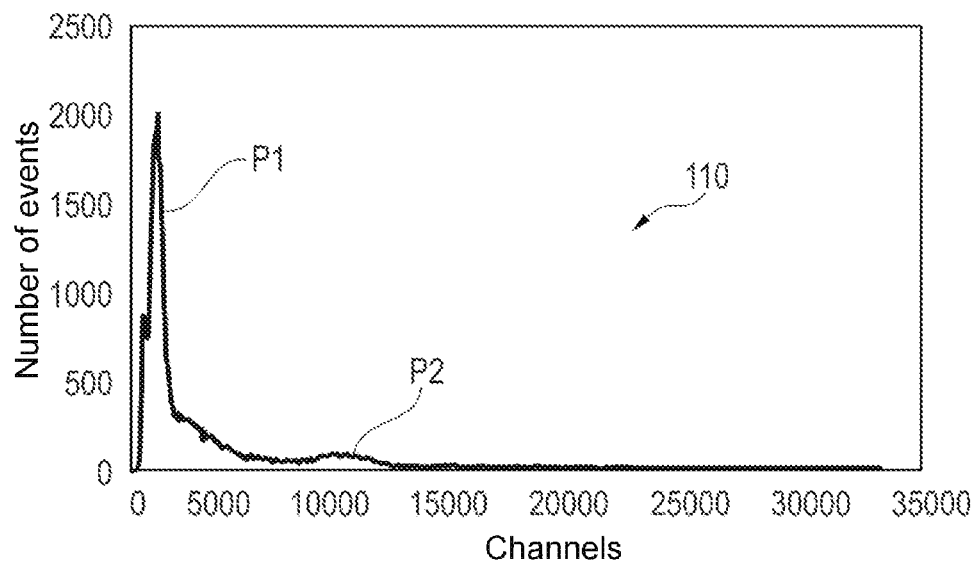

The two-dimensional spectrum shown in FIG. 9a displays pulse groupings in the four zones defined above, meaning that detector 1 has detected alpha, beta, gamma and neutron ionizing radiation.

Figure 9E:
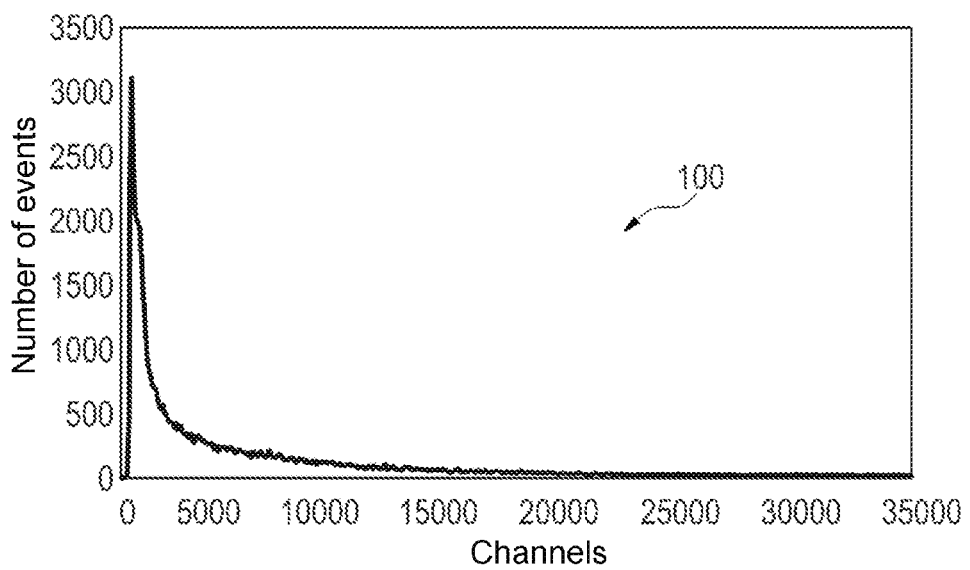

Detector 1 is thus capable of fivefold discrimination, i.e. it can discriminate between fast and thermal neutrons (peaks P1 and P2 in FIG. 9d, respectively), alpha radiation (FIG. 9b), beta radiation (FIG. 9c) and gamma radiation (FIG. 9e).

Example 2

Figure 10:
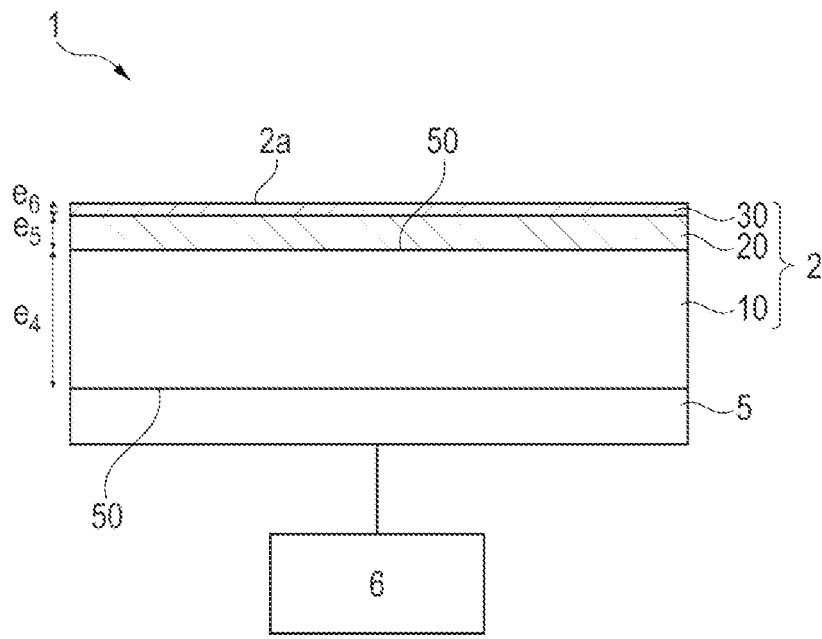
FIG. 10 is a partial schematic representation of another implementation example of a detector.

FIG. 10 shows a variant of a detector 1 according to the invention, including two plastic scintillators 10, 20 and an inorganic scintillator 30.

In this example, the plastic scintillators 10 and 20 are prepared via a method similar to that which has just been described.

Plastic scintillator 10 preferentially detects neutrons and gamma rays, and has a thickness $e_4$ of about 7000 µm, a mean photoluminescence decay constant $\tau_4$ of about 3.3 ns, and a refractive index of about 1.58.

Plastic scintillator 20 preferentially detects beta radiation, has a thickness $e_5$ of about 153 µm, a mean photoluminescence decay constant $\tau_4$ of about 47 ns, and a refractive index of about 1.60.

To prepare inorganic scintillator 30, a mixture of silver-doped zinc sulfide (ZnS:Ag) and polystyrene is dispersed in toluene, the mixture being, for example, 80 m % ZnS:Ag and 20 m % polystyrene, m % denoting here the mass percentage.

The mixture is then poured and spread as a thin layer directly onto scintillator 20, for example by means of a doctor blade-type device, before being left under ventilation for a period of about two hours in order to evaporate off the toluene.

The ZnS:Ag preparation is obtained, for example, from a commercial fluorescent powder with a particle size of about 8 µm.

Scintillator 30 thus obtained has a thickness $e_6$ of about 43 µm and a mean photoluminescence decay constant $\tau_6$ of about 200 ns.

As described previously, scintillator 10 is connected to scintillators 20 and 30 by means of an optical binder 50, for example an optical grease or cement.

In the example under consideration, scintillators 10, 20 and 30 have an emission spectrum whose maximum is at a wavelength of 425 nm for scintillator 10, 435 nm for scintillator 20 and 450 nm for scintillator 30.

Detector 1 thus obtained is first subjected to one source of radiation at a time, as described above, so as to determine the grouping zones allowing the pulses from each type of radiation to be isolated.

Detector 1 is subjected to a partially thermalized californium-252 source emitting both fast and thermal neutrons, and gamma rays.

Figure 11A:
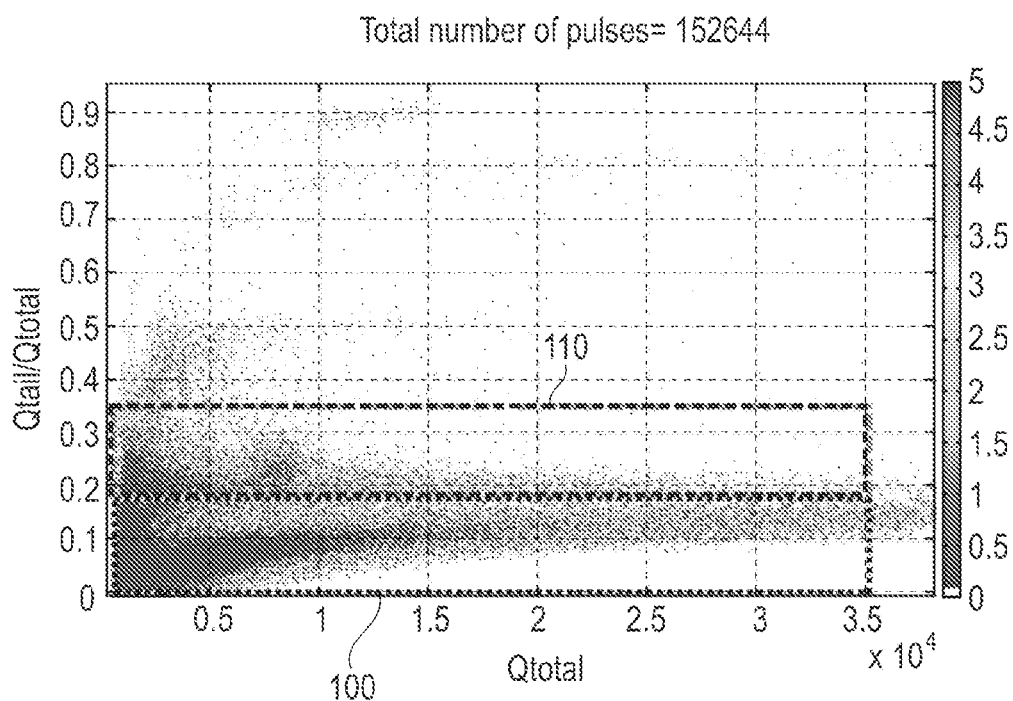
FIG. 11a, FIG. 11b, and FIG. 11c illustrate detection results when the detector in FIG. 10 is exposed to a source of neutrons and gamma rays jointly emitted by californium-252.

Energy is deposited in scintillator 10, and two zones of interest 100 and 110 are determined on the two-dimensional spectrum represented in FIG. 11a, respectively grouping pulses resulting from gamma and neutron interactions.

Figure 11B:
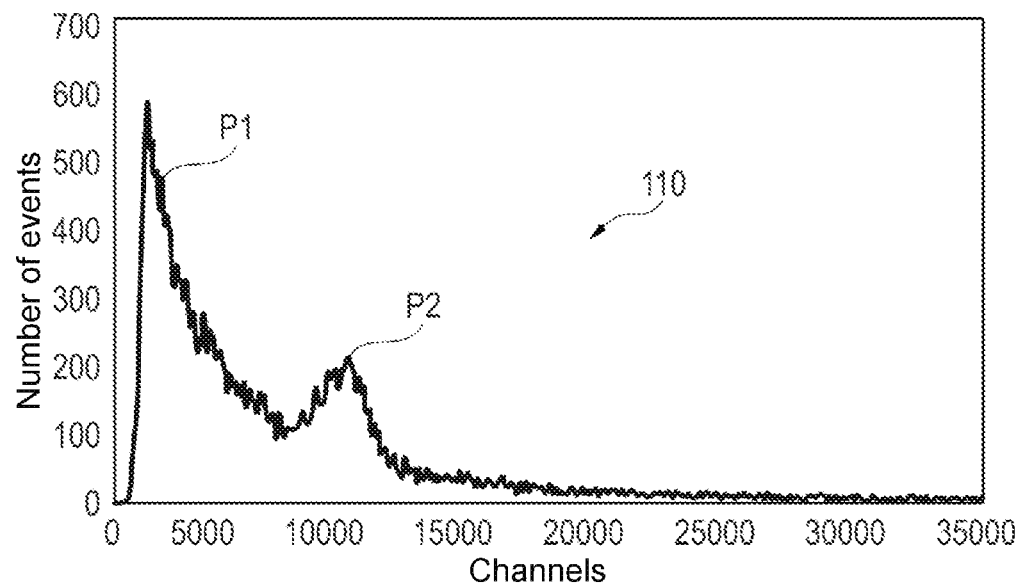
Figure 11C:
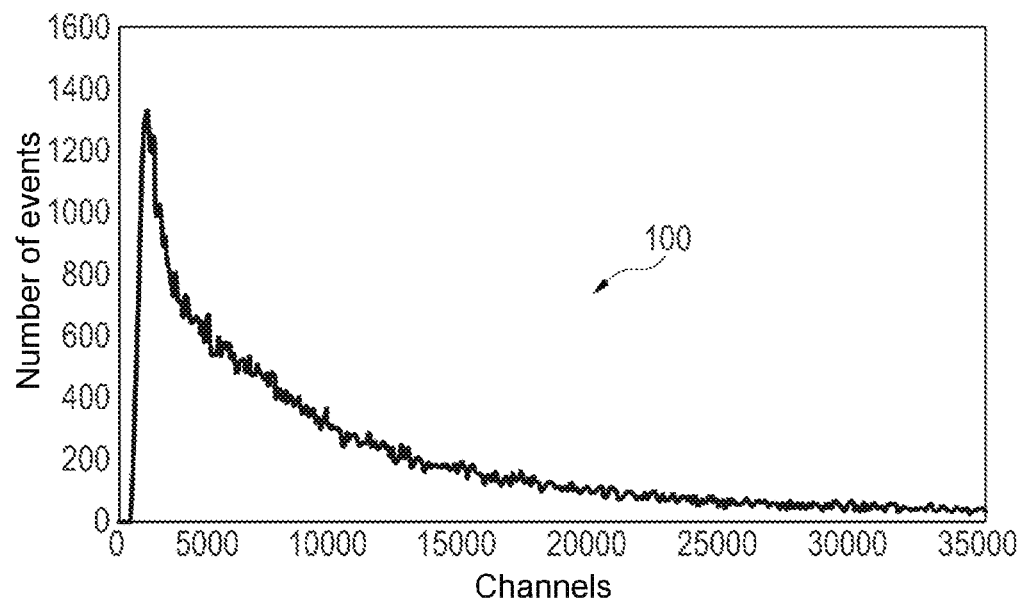

Pulse shape analysis thus allows neutrons to be distinguished from gamma rays, as shown in FIGS. 11b and 11c.

The neutron energy spectrum in FIG. 11b shows an exponential spread P1 and a peak P2 corresponding to fast and thermal neutrons, respectively.

Figure 12A:
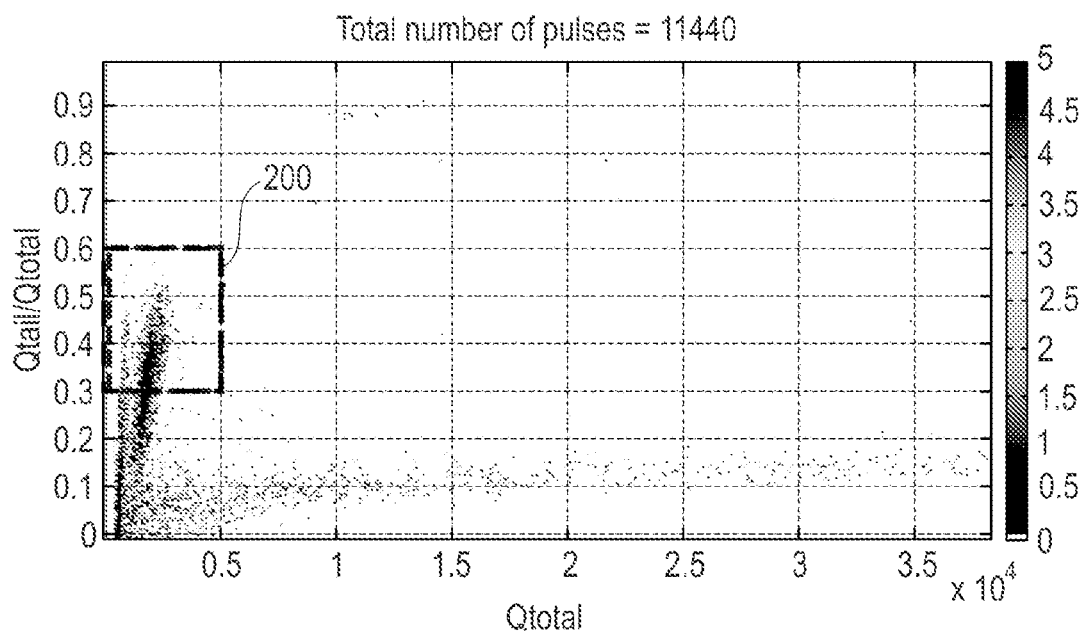
FIG. 12a and FIG. 12b illustrate detection results when the detector in FIG. 10 is exposed to a carbon-14 beta radiation source.
Figure 12B:
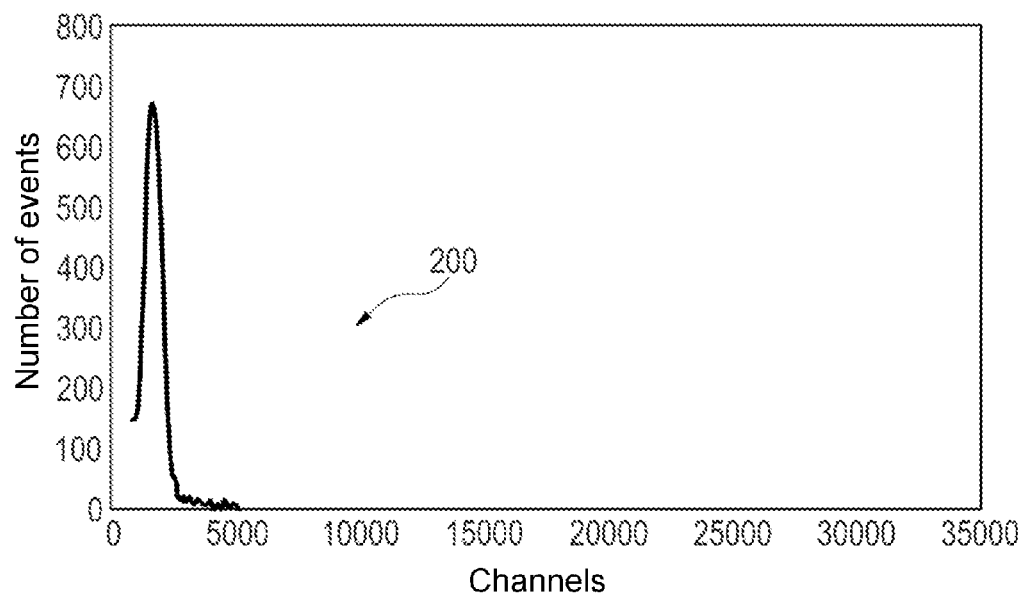

Similarly, detector 1 is subjected to a carbon-14 beta source, and the zone of interest 200 is determined, grouping together the pulses resulting from beta interactions with scintillator 20, as represented on the two-dimensional spectrum shown in FIG. 12a and the associated beta energy spectrum shown in FIG. 12b.

Figure 13A:
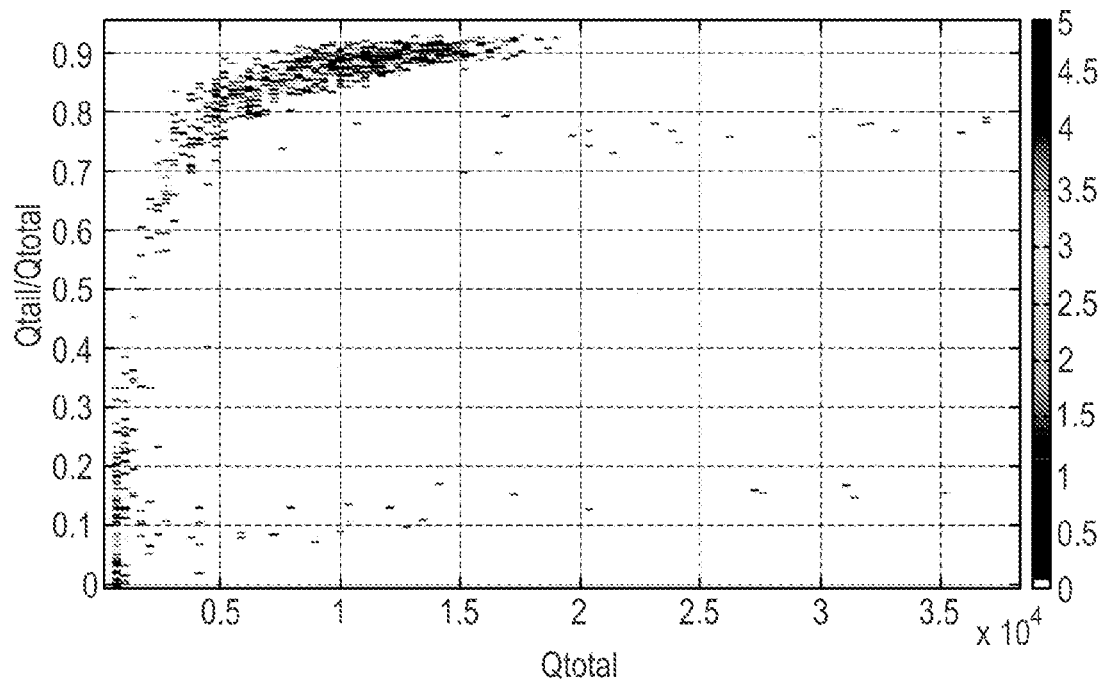
FIG. 13a and FIG. 13b illustrate detection results when the detector in FIG. 10 is exposed to a plutonium-239 alpha/gamma radiation source.
Figure 13B:
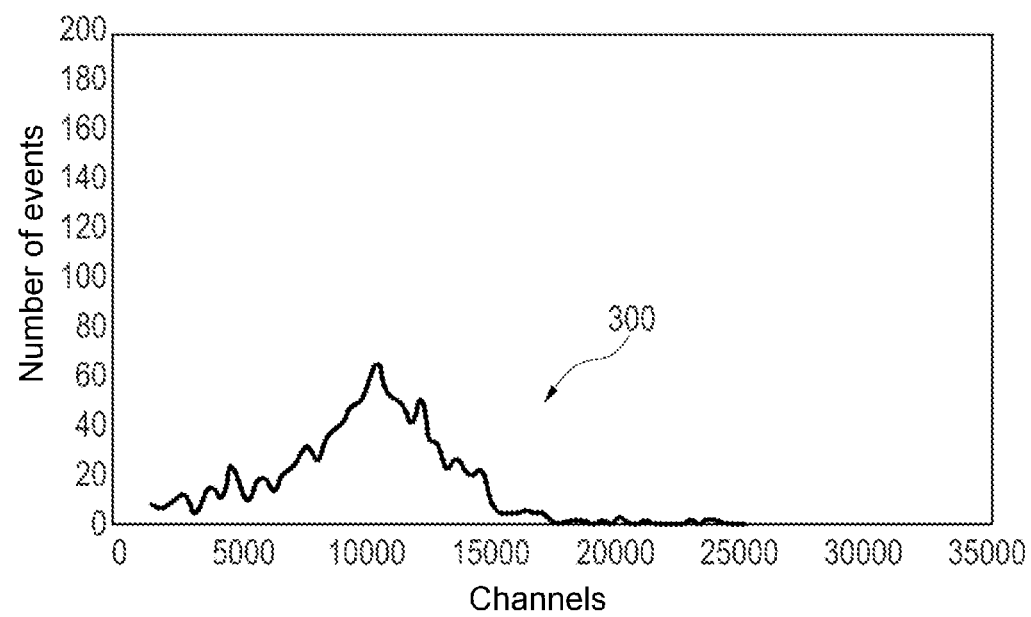

Detector 1 is also subjected to a plutonium-239 alpha source, for which energy is deposited in inorganic scintillator 30, allowing the zone of interest 300 to be defined, grouping together the pulses resulting from alpha interactions with this scintillator, as illustrated in the two-dimensional spectrum shown in FIG. 13a and the associated alpha energy spectrum shown in FIG. 13b.

The zones of grouping by radiation type are summarized for this example of detector design in Table 2 below.

TABLE 2

|  | x-axis ($Q_{tot}$) | y-axis ($Q_{tail}/Q_{tot}$) |
|---|---|---|
| Alpha - Zone 300 | 0-25000 | 0.8-1.0 |
| Beta - Zone 200 | 0-5000 | 0.3-0.6 |
| Neutrons - Zone 110 | 0-35000 | 0.19-0.33 |
| Gamma - Zone 100 | 0-35000 | 0-0.1875 |

Similarly to what has been described previously, the detector thus produced can discriminate between several types of radiation, notably when it is irradiated simultaneously by several radiation sources.

Figure 14A:
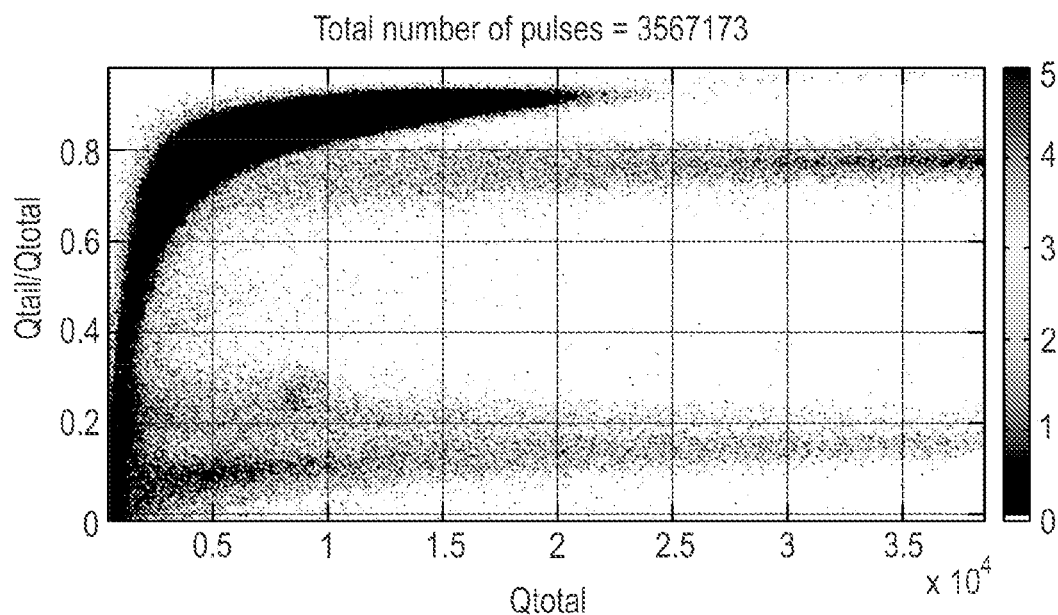
FIG. 14a, FIG. 14b, FIG. 14c and FIG. 14d illustrate detection results when the detector in FIG. 10 is simultaneously exposed to two radiation sources, curium-244 and californium-252.
Figure 14B:
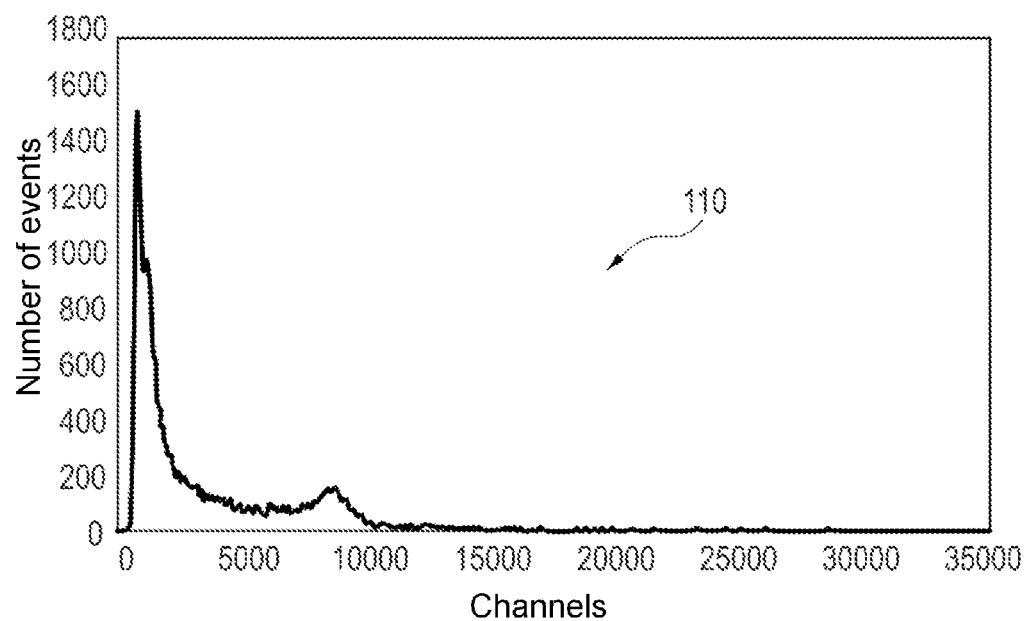
Figure 14C:
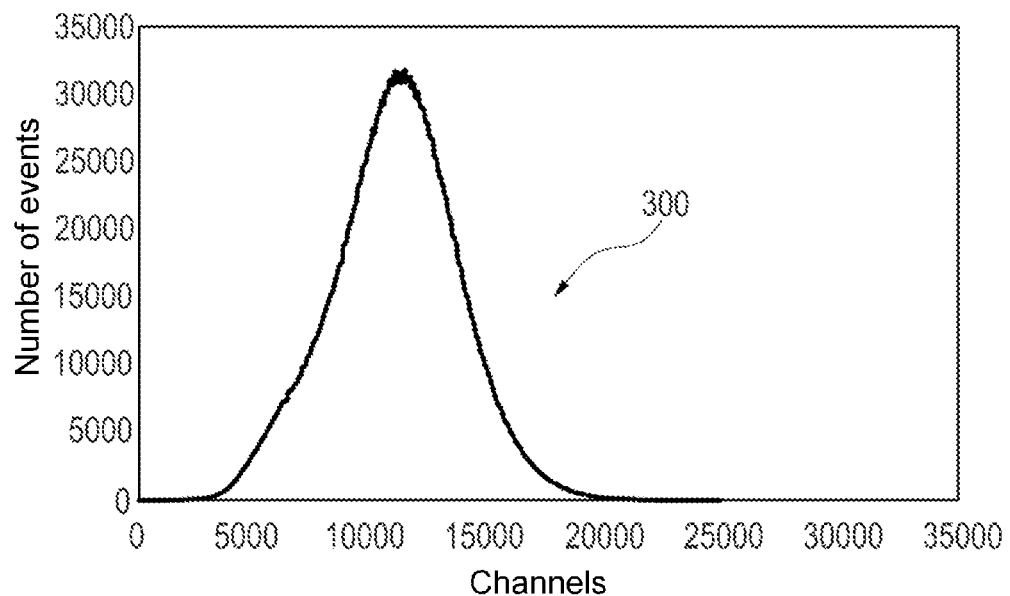
Figure 14D:
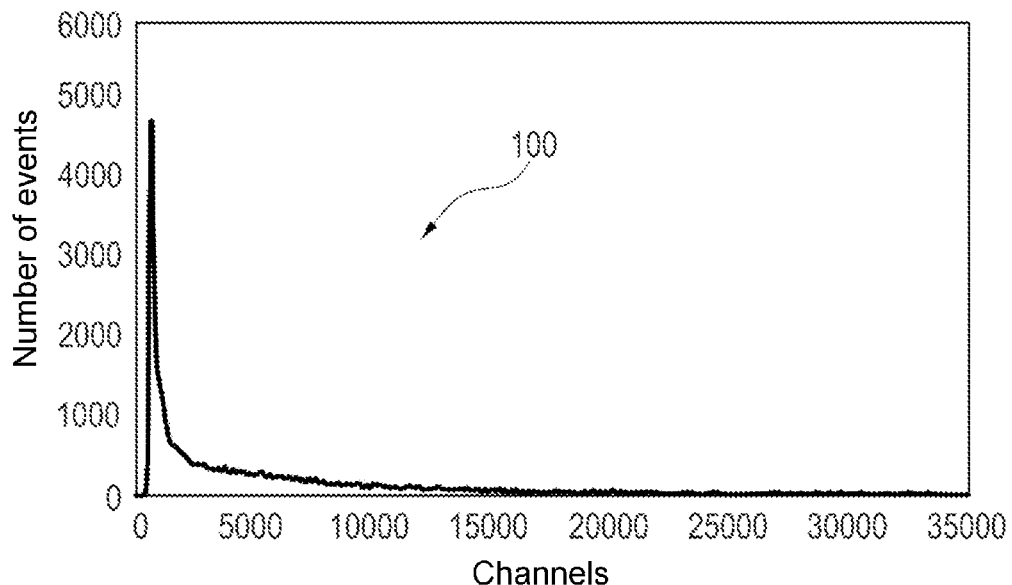

For example, when detector 1 is subjected to a curium-244 source and a californium-252 source, neutrons (FIG. 14b), alpha radiation (FIG. 14c) and gamma radiation (FIG. 14d) can be discriminated by means of the dimensional spectrum shown in FIG. 14a.

Figure 15A:
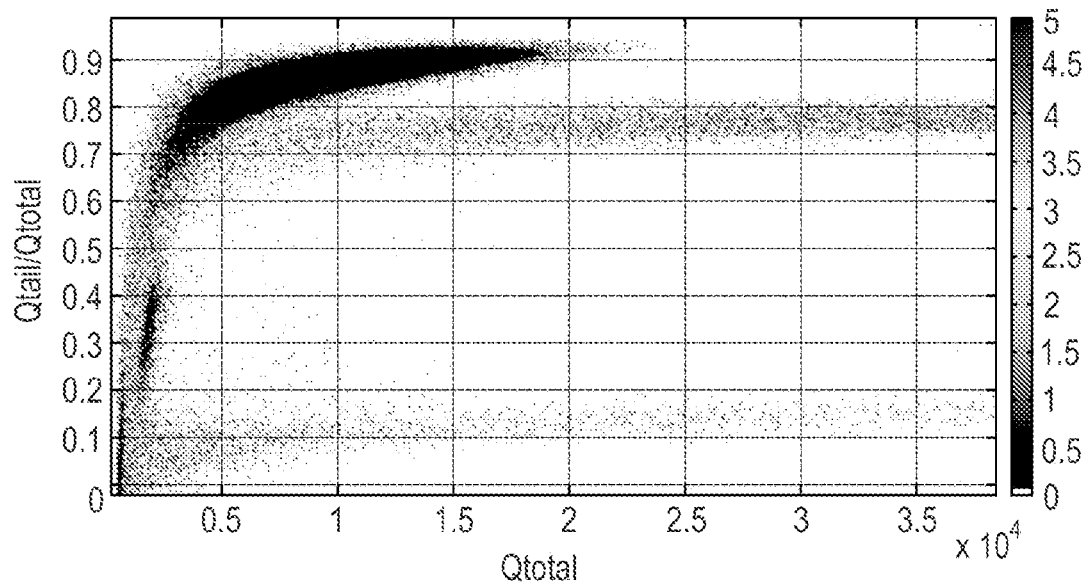
FIG. 15a, FIG. 15b and FIG. 15c illustrate detection results when the detector in FIG. 10 is simultaneously exposed to two radiation sources, carbon-14 and curium-244.
Figure 15B:
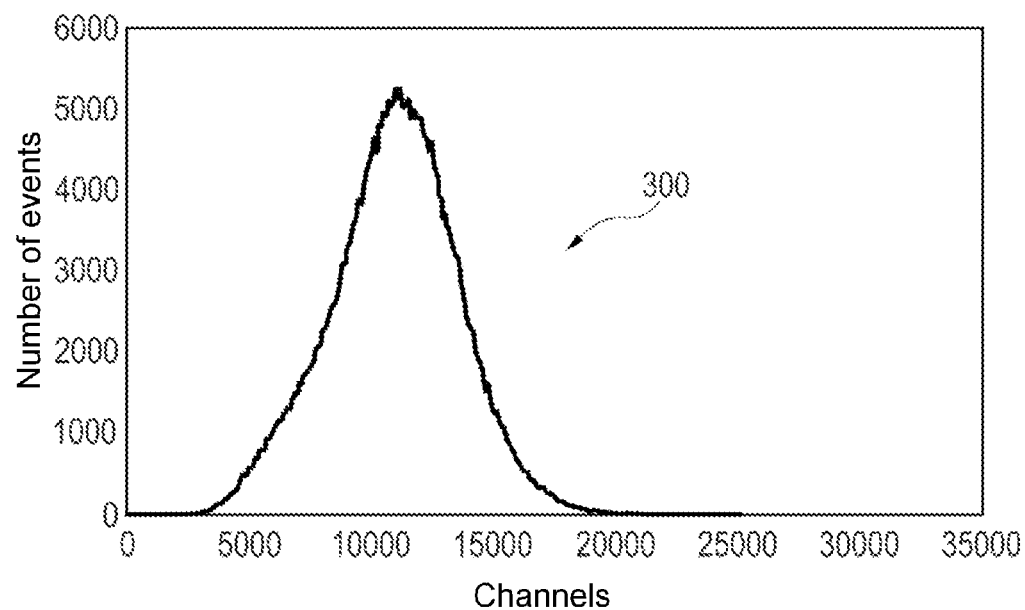
Figure 15C:
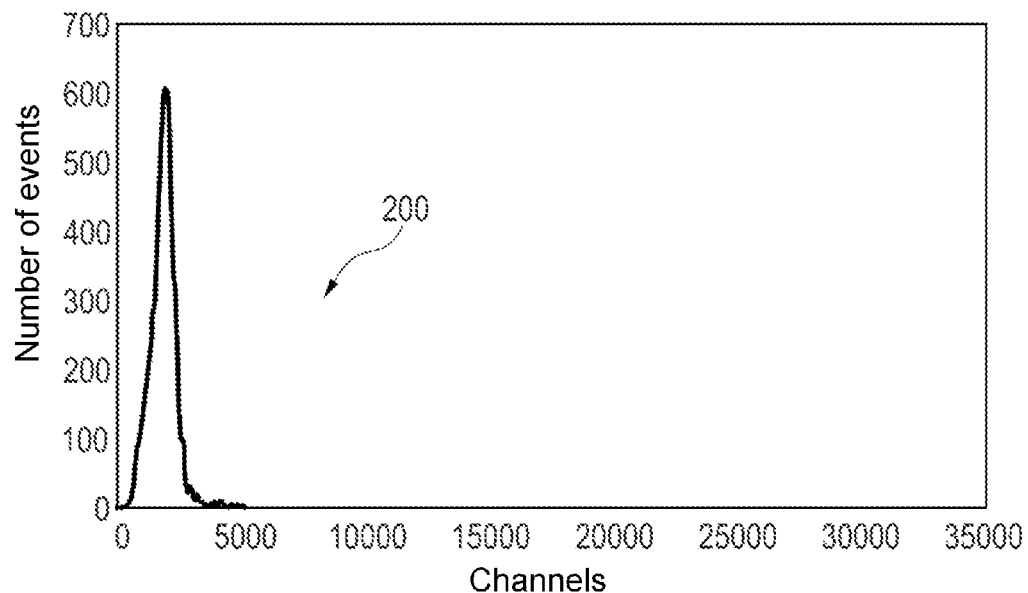

In another example shown in FIGS. 15a to 15c, detector 1 is simultaneously subjected to a curium-244 source and a carbon-14 source, and has the ability to discriminate alpha radiation (FIG. 15b) from beta radiation (FIG. 15c).

Figure 16A:
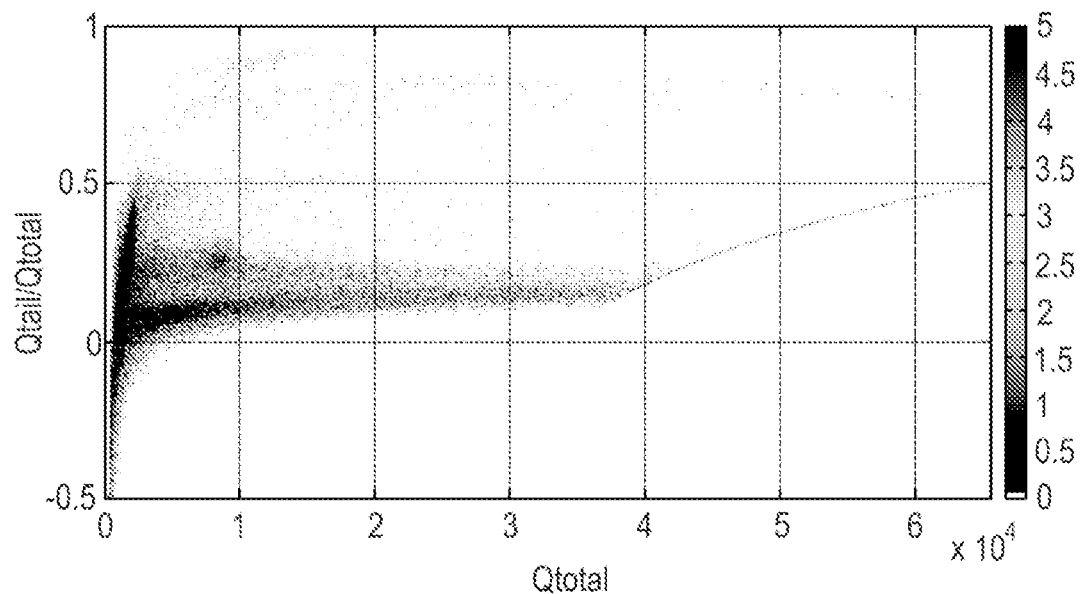
FIG. 16a, FIG. 16b, FIG. 16c and FIG. 16d illustrate detection results when the detector in FIG. 10 is simultaneously exposed to two radiation sources, carbon-14 and californium-252.
Figure 16B:
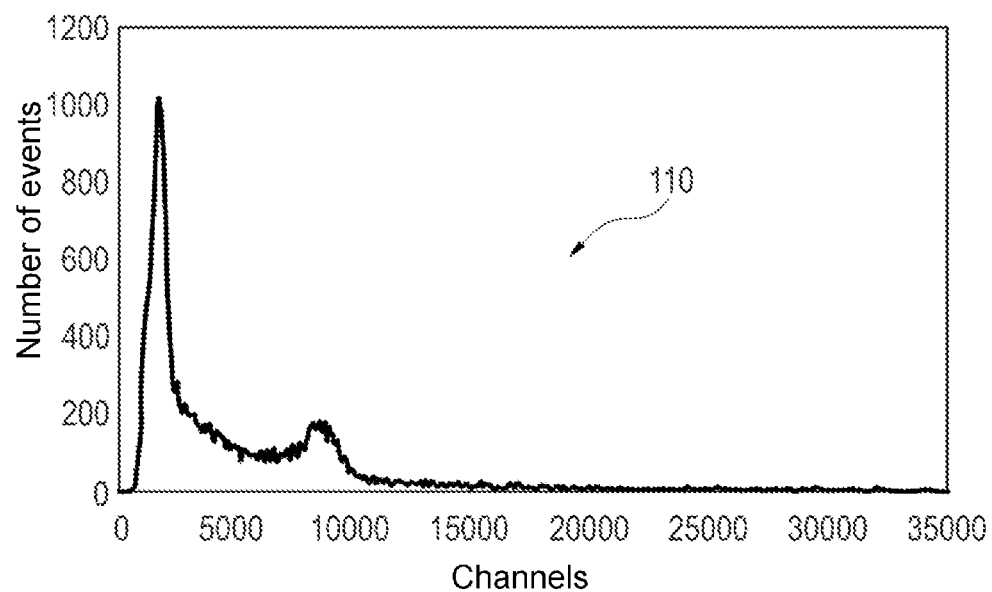
Figure 16C:
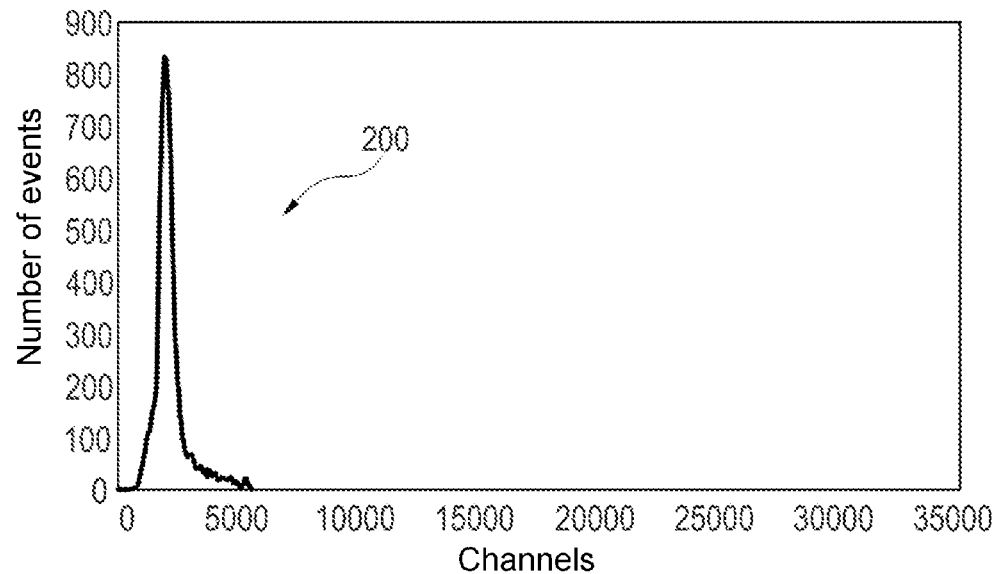
Figure 16D:
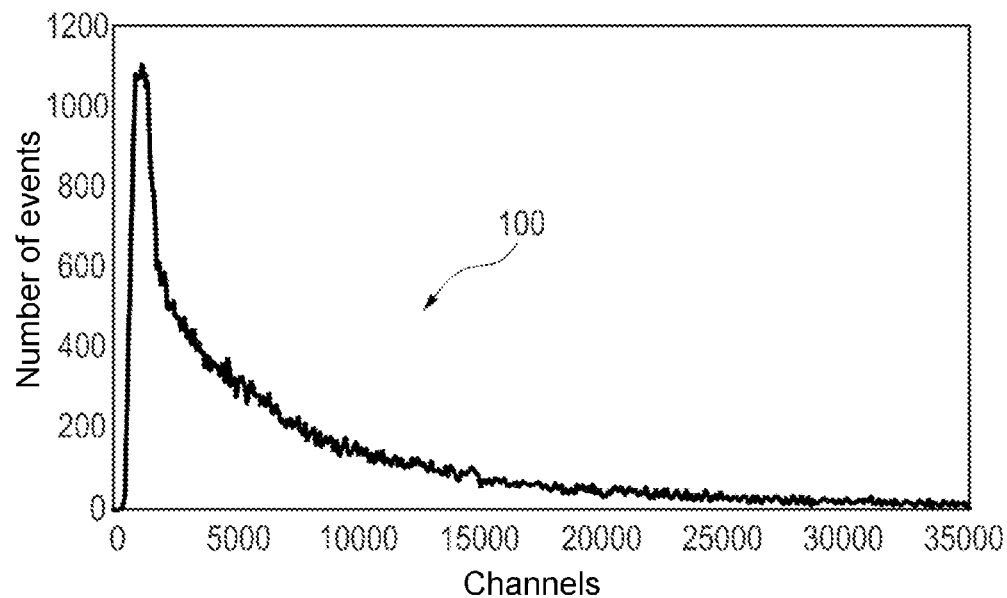

In the example shown in FIGS. 16a to 16d, detector 1 is simultaneously subjected to a californium-252 source and a carbon-14 source, and has the ability to discriminate neutrons (FIG. 16b) from beta radiation (FIG. 16c) and gamma radiation (FIG. 16d).

Finally, in the example shown in FIGS. 17a to 17e, detector 1 is simultaneously subjected to all three sources of ionizing radiation, namely a partially thermalized californium-252 source, a carbon-14 source and a plutonium-239 source.

Figure 17A:
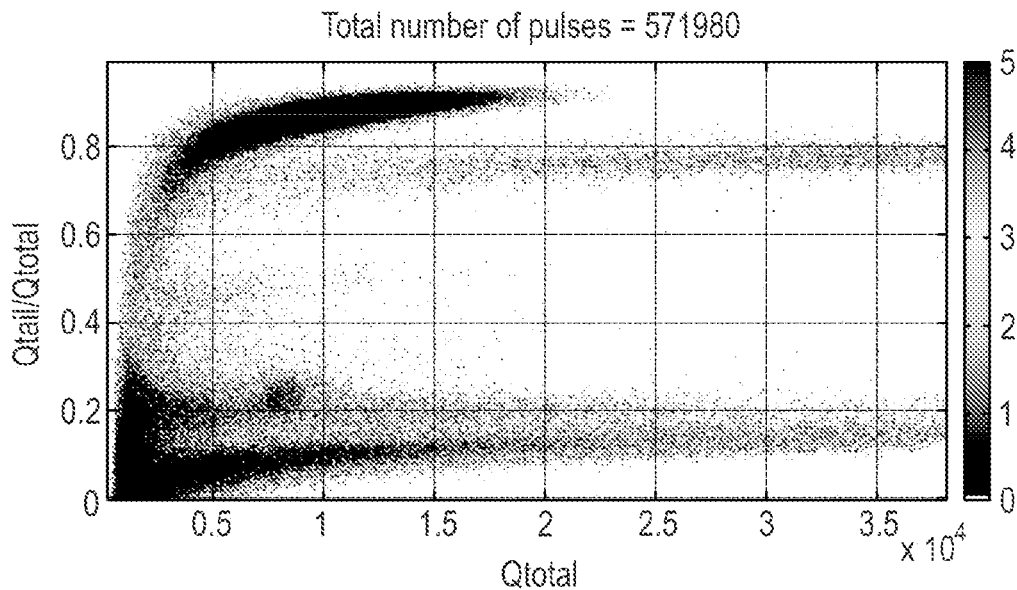
FIG. 17a, FIG. 17b, FIG. 17c, FIG. 17d and FIG. 17e illustrate detection results when the detector in FIG. 10 is simultaneously exposed to three radiation sources, carbon-14, plutonium-239, and californium-252.
Figure 17B:
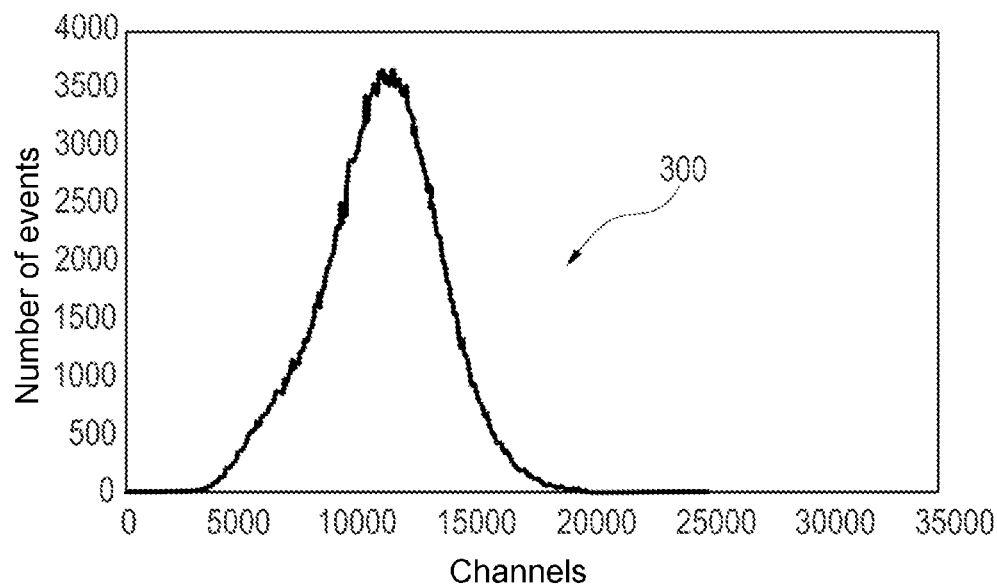
Figure 17C:
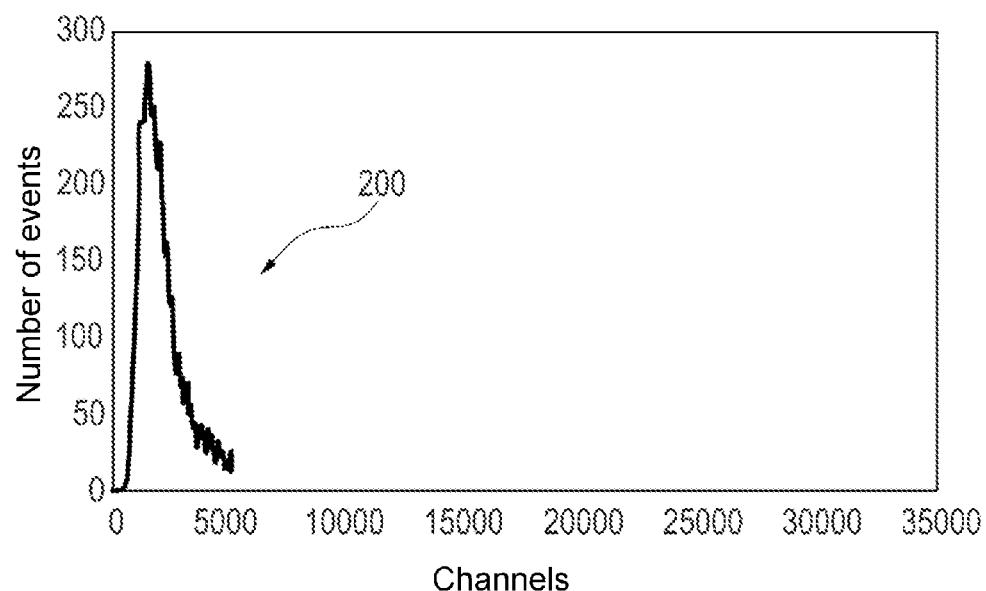
Figure 17D:
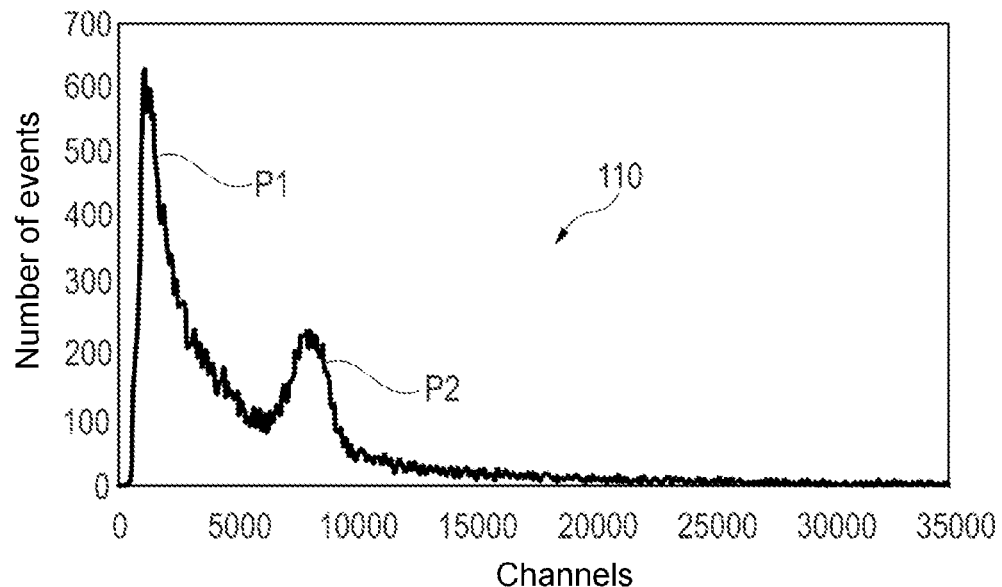

The two-dimensional spectrum represented in FIG. 17a shows pulse groupings in the four zones defined above, meaning that detector 1 has detected ionizing radiation of the alpha, beta, gamma and neutron types.

Figure 17E:
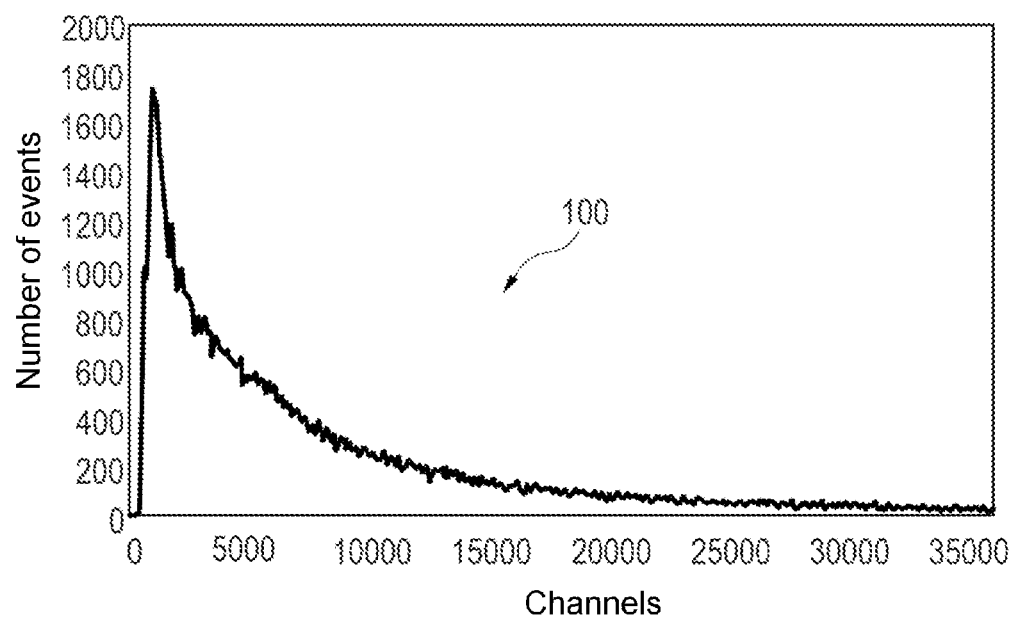

Detector 1 is thus capable of fivefold discrimination, i.e. it can discriminate between fast and thermal neutrons (exponential spread P1 and peak P2 in FIG. 17d, respectively), alpha radiation (FIG. 17b), beta radiation (FIG. 17c) and gamma radiation (FIG. 17e).

Figure 18:
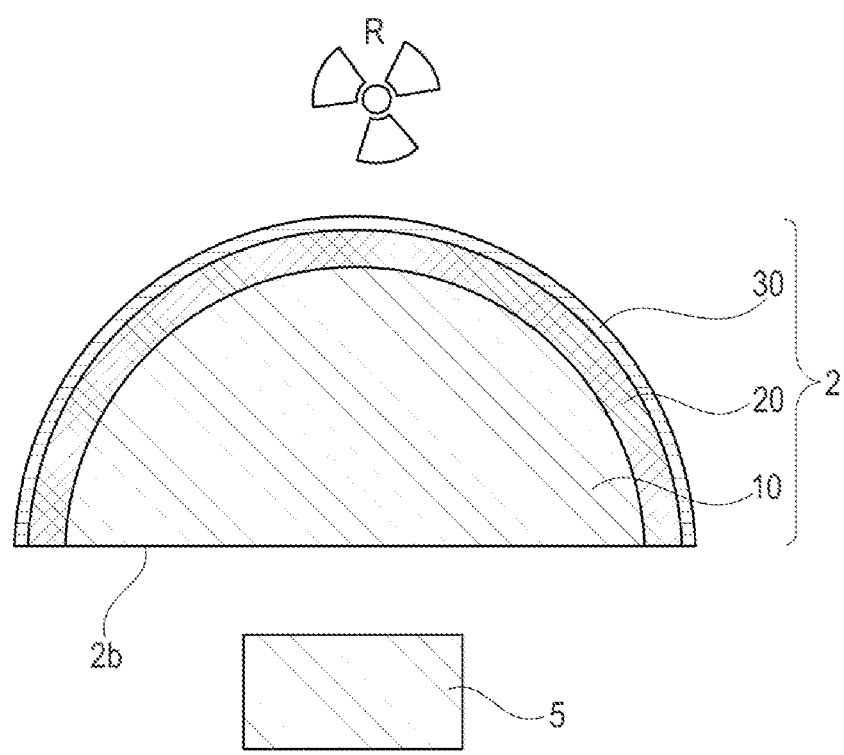
FIG. 18 is a partial schematic representation of an example of a detector according to the invention, in hemispherical form.

Other arrangements of the various scintillators are possible. The active structure may be in the form of a half-sphere, as shown in FIG. 18, or other convex shapes, with the thinnest scintillator on the outside of the structure and the thickest scintillator at its core.

The active structure 2 may also include an inorganic scintillator 60 that is capable of gamma spectrometry of any incident gamma radiation.

Figure 19A:
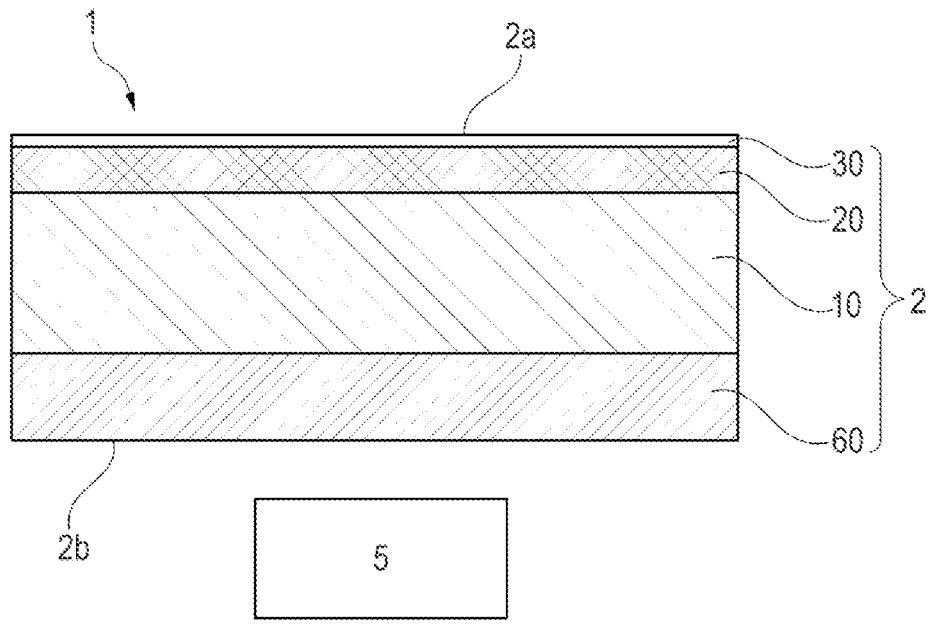
FIG. 19a, FIG. 19b, FIG. 19c and FIG. 19d are partial schematic illustrations of different examples of a detector including four scintillators.
Figure 19B:
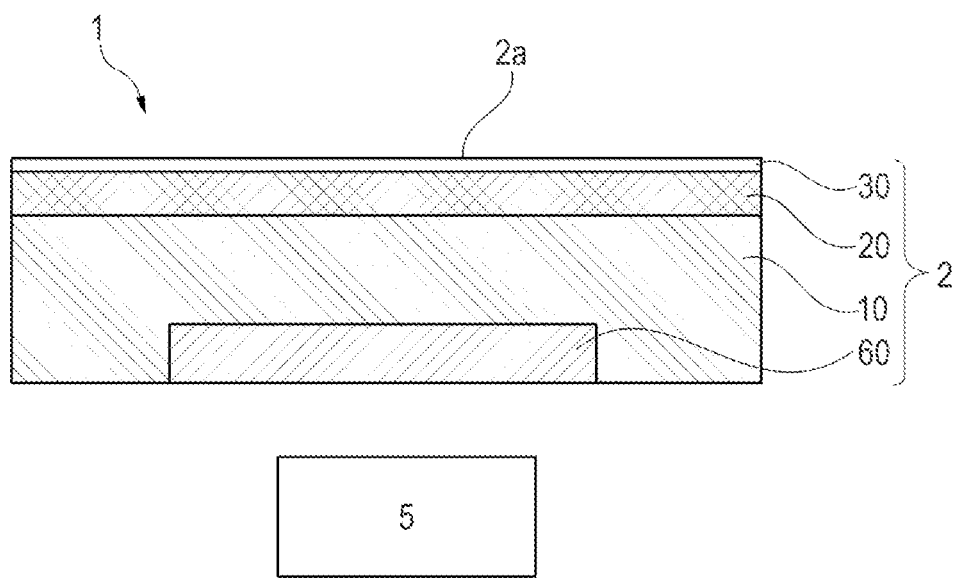
Figure 19C:
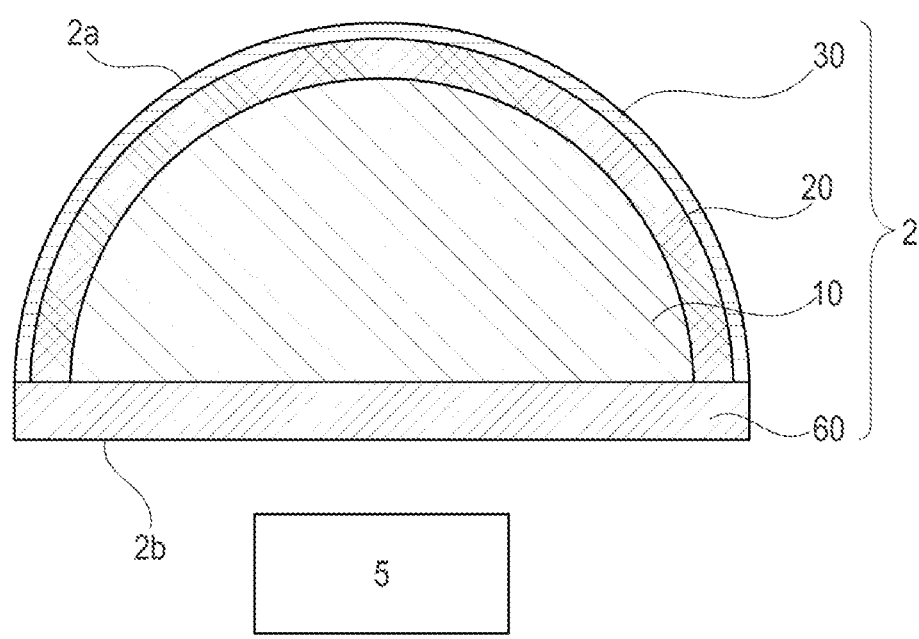

The inorganic scintillator 60 may be arranged in contact with, notably behind or alongside, the first scintillator 10, as illustrated in FIG. 19a for a parallelepipedal active structure 2, and in FIG. 19b for a hemispherical active structure 2.

Figure 19D:
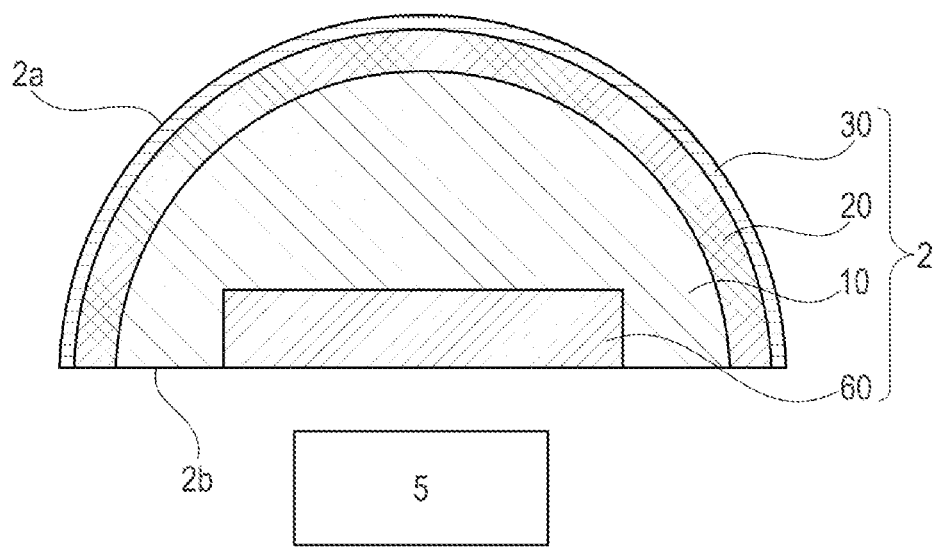

The inorganic scintillator 50 may again be integrated into the first scintillator 10, as shown in FIG. 19b and FIG. 19d.

Example 3

Figure 20:
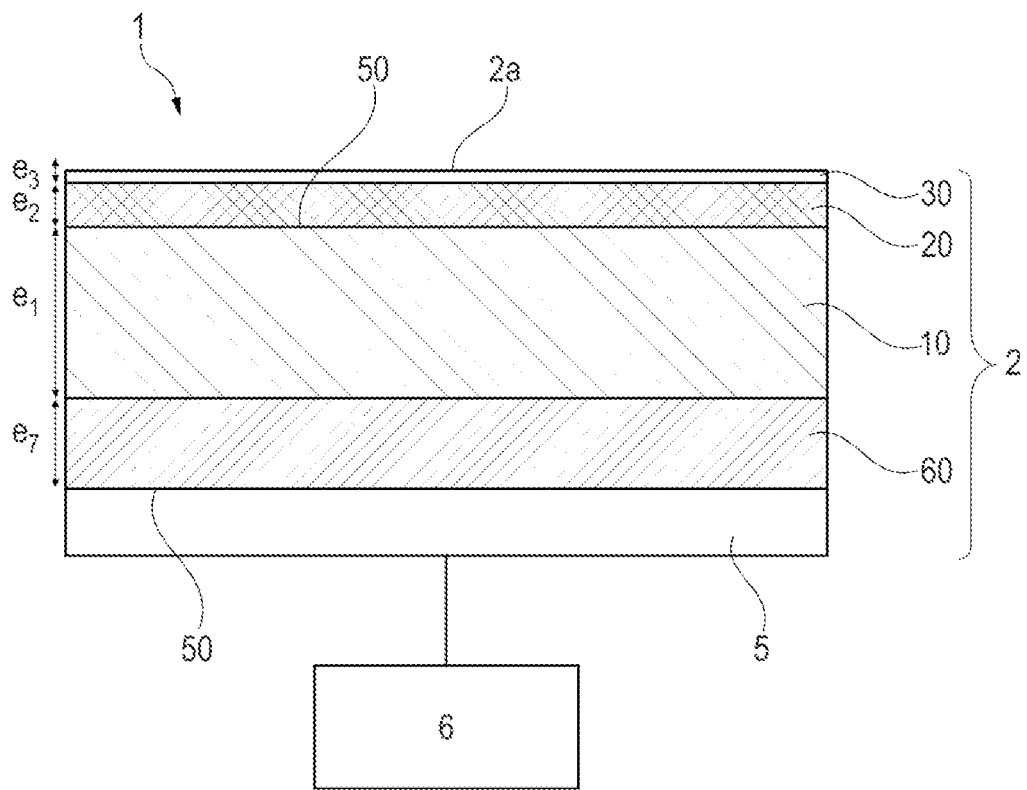
FIG. 20 is a partial schematic representation of another implementation example of a detector.

FIG. 20 shows an implementation example of a detector 1 including such an inorganic scintillator 60.

Detector 1 includes, for example, three organic scintillators 10, 20 and 30, for example identical to those of the first implementation example described above and shown in FIG. 2.

The inorganic scintillator 60 is arranged behind the first organic scintillator 10.

It is, for example, of the BGO type and has a thickness $e_7$ of about 3 cm.

As described previously, the detector also includes a photomultiplier 5 arranged behind the active structure 2, for example connected to the inorganic scintillator 60 by means of an optical binder 50.

Detector 1 thus obtained is subjected simultaneously to three sources of ionizing radiation, namely a californium-252 source, a carbon-14 source and a plutonium-239 source.

Figure 21A:
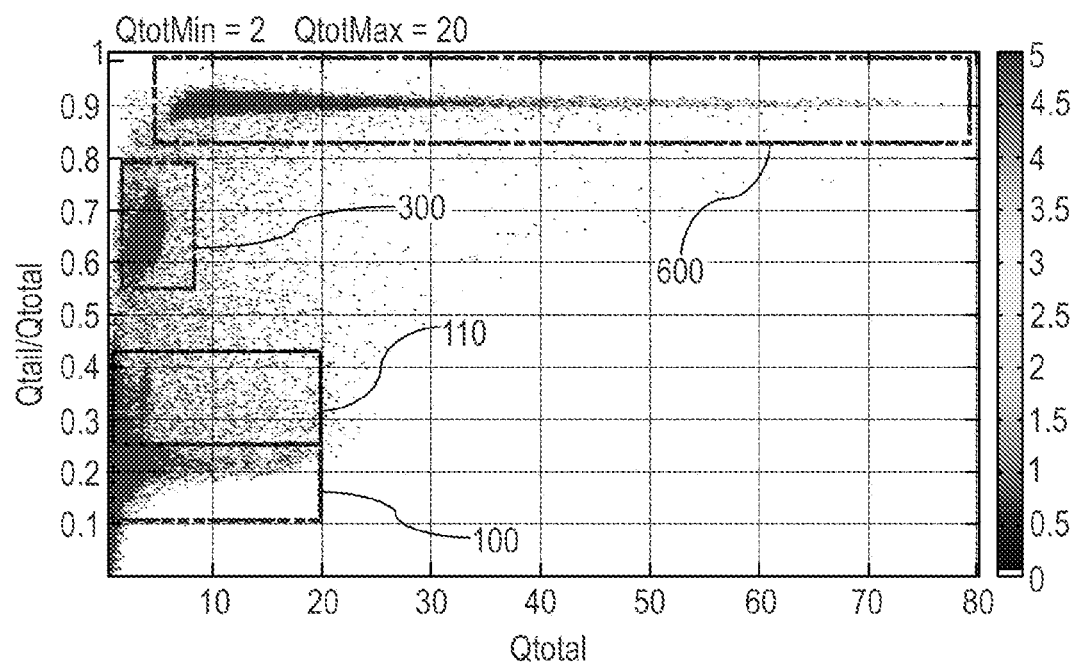
FIG. 21a, FIG. 21b, FIG. 21c, FIG. 21d and FIG. 21e illustrate detection results when the detector in FIG. 19a is simultaneously exposed to three radiation sources, carbon-14, plutonium-239 and californium-252.

The two-dimensional spectrum represented in FIG. 21a shows pulse groupings in zones 300, 100, 110 corresponding to the detection of alpha (FIG. 21c), gamma (FIG. 21e) and neutron (FIG. 21d) ionizing radiation, respectively.

The gamma rays whose pulses appear in zone 100 come from interactions with the plastic scintillator 10.

Figure 21B:
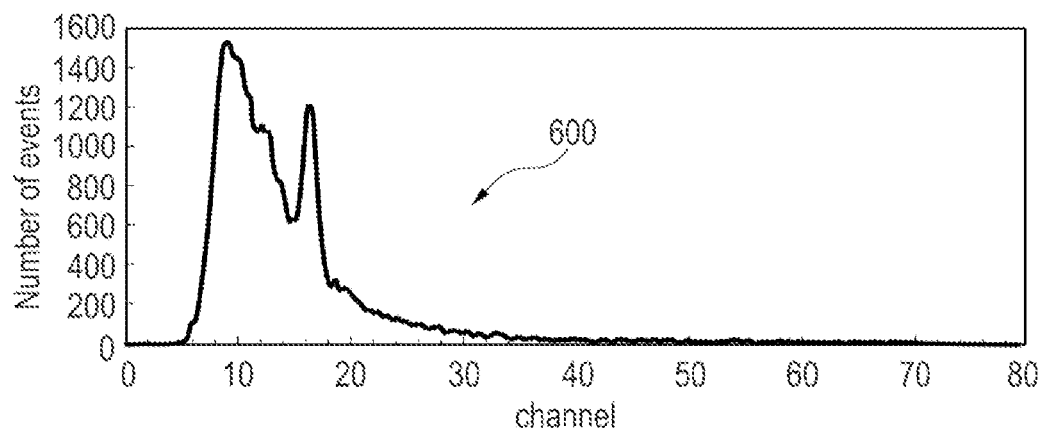
Figure 21C:
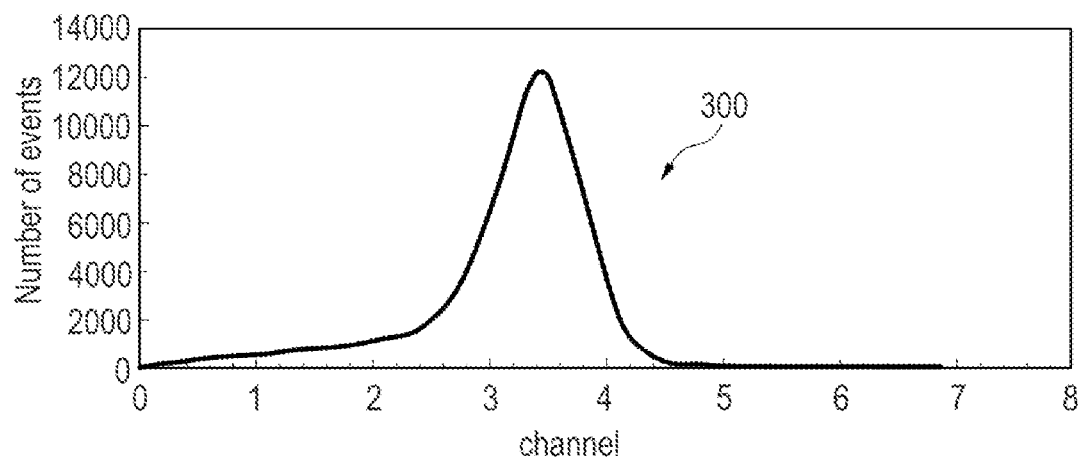
Figure 21D:
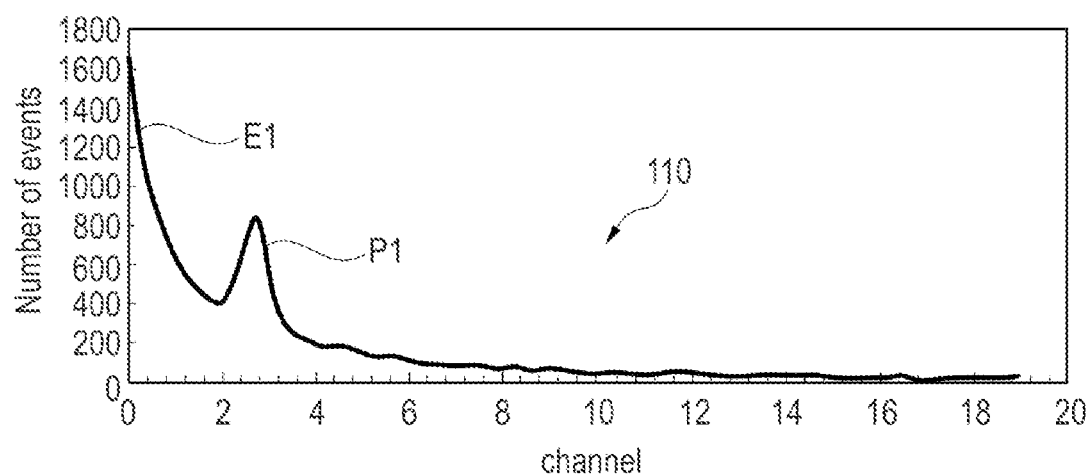
Figure 21E:
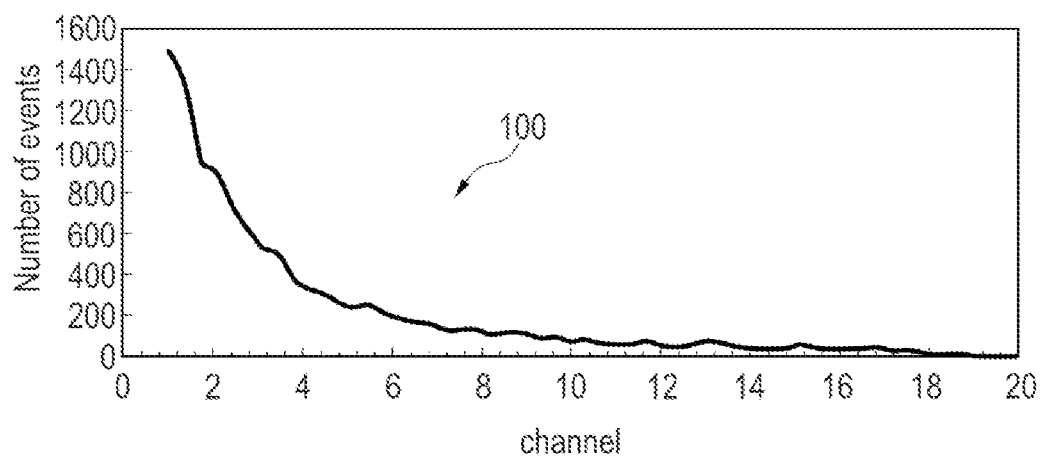

A new zone 600 may be defined, corresponding to the interactions of gamma rays with the inorganic scintillator 60, allowing the energy spectrum shown in FIG. 21b to be obtained.

This spectrum has a characteristic profile which makes it possible to determine the emission energy value(s) of the gamma rays detected, and thus to identify the source(s) of radiation.

Needless to say, the invention is not limited to the examples that have just been described.

For example, radioactive sources other than those tested may be used to define the abovementioned zones of interest.

The combined preparation of scintillators 20 and 30 one on top of the other may be achieved via methods other than the use of a doctor blade device, notably via the "autogenous" coupling process described in patent application FR2983310.

Other molecules may be used for scintillator 10 as fluorescent elements; a person skilled in the art will know how to adapt the formulation of this scintillator according to the need.

The invention claimed is:

1. A radiation detector, comprising:
   an active structure having an input face and an output face, and configured to receive incident ionizing radiation, wherein the active structure comprises a plastic scintillator assembly comprising
      a first organic scintillator comprising a neutron capture material, and being configured to allow discrimination between fast neutrons, thermal neutrons, and photons,
      a second scintillator arranged in front of the first scintillator, closer to the input face than the first scintillator, and capable of preferentially detecting alpha radiation and/or beta radiation, and
      a third scintillator arranged in front of the second scintillator closer to the input face than the second scintillator, wherein the third scintillator is suitable for preferentially detecting alpha radiation,
   wherein the first scintillator and the second scintillator have different mean photoluminescence decay constants due to constituents thereof,
   wherein the second scintillator is thinner than the first scintillator, and
   wherein a difference between refractive indices of two adjacent scintillators is not more than 0.5.

2. The detector of claim 1, further comprising:
   a gain photon-electron converter arranged behind the output face of the active structure and configured to collect light emitted within the scintillators.

3. The detector of claim 1, wherein the scintillators increase in thickness going from the input face to the output face.

4. The detector of claim 1, wherein the first scintillator has a thickness in a range of from 3 to 100 mm.

5. The detector of claim 1, wherein the second scintillator (ii) is suitable for preferentially detecting the beta radiation and has a thickness in a range of from 50 to 250 microns.

6. The detector of claim 1, wherein the third scintillator bas a thickness in a range of from 1 to 50 microns.

7. The detector of claim 1, wherein a difference between the mean photoluminescence decay constants of two adjacent scintillators is in a range of from 25 to 250 ns.

8. The detector of claim 1, wherein the first scintillator is a plastic scintillator comprising a primary fluorescent element, and a neutron capture element.

9. The detector of claim 8, wherein the primary fluorescent element comprises biphenyl, meta-terphenyl or 2,5-diphenyloxazole, and
   wherein the neutron capture element comprises lithium, boron, cadmium, or gadolinium.

10. The detector of claim 8, wherein the first scintillator further comprises a secondary fluorescent element.

11. The detector of claim 1, wherein the active structure further comprises an inorganic scintillator configured to perform gamma spectrometry.

12. The detector of claim 11, wherein the inorganic scintillator is based on silver-doped zinc sulfide (ZnS:Ag) or cerium-doped gadolinium pyrosilicate ($Gd_2Si_2O_7$:Ce).

13. The detector of claim 11, wherein the inorganic scintillator is on the output-face side of the active structure.

14. The detector of claim 1, wherein a difference between refractive indices of two adjacent scintillators is not more than 0.05.

15. The detector of claim 1, wherein the scintillators have a mean photoluminescence decay constant which decreases going from the input face to the output face.

16. The detector of claim 1, wherein the first scintillator has an emission spectrum whose maximum is at a wavelength in a range of from 400 to 630 nm.

17. The detector of claim 1, wherein the mean photoluminescence decay constant of the first scintillator is in a range of from 1 to 20 ns.

18. A process for detecting and discriminating ionizing radiation, the method comprising:
   exposing the input face of the detector of claim 1 to a radiation source; and
   analyzing, at least based on knowledge of the mean photoluminescence decay constants of the scintillators, an optical signal generated by the active structure of the detector thereby discriminating as to a nature of the radiation from among at least four different types of radiation.

19. The process of claim 18, further comprising:
   collecting an optical signal generated by the active structure by a gain photon-electron converter so as to generate an electrical pulse.

20. The process of claim 18, wherein the detector further comprises an inorganic scintillator configured to perform gamma spectrometry
   wherein a gamma component, when detected, is analyzed spectrometrically.

* * * * *